(12) United States Patent
Janulewicz et al.

(10) Patent No.: US 11,960,979 B2
(45) Date of Patent: Apr. 16, 2024

(54) REINFORCEMENT LEARNING FOR AUTONOMOUS TELECOMMUNICATIONS NETWORKS

(71) Applicant: Ciena Corporation, Hanover, MD (US)

(72) Inventors: Emil Janulewicz, Nepean (CA); David Côté, Gatineau (CA); Gauravdeep Singh Shami, Ottawa (CA); Olivier Simard, Montréal (CA); Thomas Triplet, Manotick (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/470,425

(22) Filed: Sep. 9, 2021

(65) Prior Publication Data
US 2021/0406776 A1 Dec. 30, 2021

Related U.S. Application Data

(63) Continuation of application No. 16/185,471, filed on Nov. 9, 2018, now Pat. No. 11,126,929.

(60) Provisional application No. 62/583,860, filed on Nov. 9, 2017.

(51) Int. Cl.
G06N 20/00 (2019.01)
H04L 45/00 (2022.01)
H04L 45/02 (2022.01)
H04L 45/12 (2022.01)
H04L 45/121 (2022.01)
H04L 45/125 (2022.01)
H04W 24/02 (2009.01)
H04W 24/08 (2009.01)
H04W 84/04 (2009.01)

(52) U.S. Cl.
CPC ............ *G06N 20/00* (2019.01); *H04L 45/08* (2013.01); *H04L 45/121* (2013.01); *H04L 45/124* (2013.01); *H04L 45/125* (2013.01); *H04L 45/70* (2013.01); *H04W 24/02* (2013.01); *H04W 24/08* (2013.01); *H04W 84/042* (2013.01)

(58) Field of Classification Search
None
See application file for complete search history.

(56) References Cited

U.S. PATENT DOCUMENTS 8,897,140 B1 * 11/2014 Bhattacharya ........ H04L 47/122 370/237
9,871,582 B2    1/2018 Djukic et al.
9,924,392 B2    3/2018 Côté et al.
(Continued)

OTHER PUBLICATIONS

David Silver et al., Mastering the Game of Go without Human Knowledge, DeepMind, 5 New Street Square, London EC4A 3TW, Oct. 18, 2017, pp. 1-42.

(Continued)

*Primary Examiner* — Anh Ngoc M Nguyen
(74) *Attorney, Agent, or Firm* — Clements Bernard Walker; Christopher L. Bernard

(57) ABSTRACT

Systems and methods include steps of determining a state of a network based on telemetry data; determining a value of a reward associated with the state; determining an action to take on the network to bring the network to a next state that is expected to have a better than or equal to value of the reward; and causing the action to be implemented in the network. The steps can also include continuing the determining steps and the causing step.

18 Claims, 24 Drawing Sheets

(56) References Cited

U.S. PATENT DOCUMENTS

| | | | |
|---|---|---|---|
| 2012/0290727 A1* | 11/2012 | Tivig | H04L 69/163 |
| | | | 709/227 |
| 2016/0212623 A1 | 7/2016 | Côté et al. | |
| 2016/0330083 A1 | 11/2016 | Djukic et al. | |
| 2017/0140270 A1 | 5/2017 | Mnih et al. | |
| 2017/0220407 A1* | 8/2017 | Estrada | G06F 11/3495 |
| 2018/0027130 A1* | 1/2018 | Yermakov | H04M 15/8022 |
| | | | 455/405 |
| 2018/0032373 A1 | 2/2018 | Chen et al. | |
| 2018/0248771 A1 | 8/2018 | Côté et al. | |
| 2018/0248905 A1 | 8/2018 | Côté et al. | |
| 2018/0376390 A1* | 12/2018 | Gemelos | H04W 8/08 |
| 2019/0065297 A1* | 2/2019 | Eichelberger | G06F 11/3476 |

OTHER PUBLICATIONS

David Côté, Using Machine Learning in Communication Networks [Invited], Mar. 2018, pp. 1-9.

Pieter Abbeel et al., Apprenticeship Learning via Inverse Reinforcement Learning, Computer Science Department, Stanford University, Stanford, CA 94305, USA, Jul. 4, 2004, pp. 1-8.

Light Reading, Networking the Communications Industry, Nokia Intros Predictive Care for Fixed Networks, Oct. 17, 2017, pp. 1-4.

Light Reading, AT&T Launches Open Source AI Platform, Oct. 30, 2017, pp. 1-4.

\* cited by examiner

EXPERT          LEARNER

REINFORCEMENT LEARNING FOR AUTONOMOUS TELECOMMUNICATIONS NETWORKS

CROSS-REFERENCE TO RELATED APPLICATION(S)

The present disclosure is a continuation of U.S. patent application Ser. No. 16/185,471, filed Nov. 9, 2018, and entitled "Reinforcement learning for autonomous telecommunications networks," which claims priority to U.S. Provisional Patent Application No. 62/583,860, filed Nov. 9, 2017, and entitled "Reinforcement learning for autonomous telecommunications networks," the contents of each are incorporated herein by reference in their entirety.

FIELD OF THE DISCLOSURE

The present disclosure generally relates to networking systems and methods. More particularly, the present disclosure relates to Reinforcement Learning (RL) for autonomous telecommunications networks.

BACKGROUND OF THE DISCLOSURE

Reinforcement learning (RL) is an area of machine learning inspired by behaviorist psychology, however in the context of autonomous telecommunications networks concerned with how software agents ought to take actions in an environment to maximize some notion of cumulative reward. In general, RL seeks to learn what to do given a problem, i.e., an optimal mapping from its current state to some action, to maximize the received reward signal in the long-run. Often, a software agent does not have any a priori knowledge of its operating environment and must discover which actions yield the most reward by trying them out. This leads to the trade-off between exploration and exploitation. The agent must exploit what it already knows to obtain rewards, but also needs to explore to make better actions in the future.

Concurrently, networks are evolving to have more and more intelligence and automation, such as through control planes and/or Software Defined Networking (SDN) frameworks. It would be advantageous to apply the techniques of Reinforcement Learning to enable autonomous, self-learning networks.

BRIEF SUMMARY OF THE DISCLOSURE

In an embodiment, a method includes obtaining performance monitoring data from a network which operates and generates the performance monitoring data reflecting a current state of the network; responsive to a predetermined reward which quantifies minimizing or maximizing an aspect in the network for Reinforcement Learning, causing one or more actions to be performed in the network, wherein the one or more actions are based on the predetermined reward; obtaining updated performance monitoring data from the network subsequent to the one or more actions to determine an updated state of the network; and continuing the causing the one or more actions to be performed in the network based on the current state and the updated state. The causing the one or more actions to be performed in the network can be performed to maximize or minimize a total discounted accumulated reward. The method can further include determining the predetermined reward; determining the one or more actions which are based on the predetermined reward; and determining the performance monitoring data corresponding to the predetermined reward. The method can further include performing learning to determine optimal actions of the one or more actions based on the current state, wherein the learning utilizes one or more of a greenfield deployment with controlled traffic, historical network data, and simulated network data.

The current state and the updated state can be determined through the performance monitoring data which is used to derive any of throughput, dropped packets, latency, jitter, out-of-order delivery, packet errors, processor usage, and memory usage. The predetermined reward can be maximizing throughput of one or more services, high-priority services, or overall throughput of the network, and wherein the one or more actions can include i) increasing or decreasing bandwidth of competing services, the one or more services, and the high-priority services, ii) re-routing some services to less congested paths, and iii) no action. The predetermined reward can be maximizing latency and/or jitter of one or more services, and wherein the one or more actions can include i) re-routing some or all of the one or more services to shorter paths, ii) re-routing some or all of the one or more services to less congested paths, iii) adjusting router memory and/or processing capability, and iv) no action. The predetermined reward can be minimizing workload of network elements, and wherein the one or more actions can include i) re-routing one or more services to less busy network elements, and ii) no action. The predetermined reward can be minimizing dropped packets or packet errors, and wherein the one or more actions can include i) increasing or decreasing bandwidth of one or more services, ii) re-routing the one or more services to less congested paths, and iii) no action.

In another embodiment, an apparatus includes a network interface communicatively coupled to one or more network elements in a network; a processor communicatively coupled to the network interface; and memory storing instructions that, when executed, cause the processor to obtain performance monitoring data from the network which operates and generates the performance monitoring data reflecting a current state of the network, responsive to a predetermined reward which quantifies minimizing or maximizing an aspect in the network for Reinforcement Learning, cause one or more actions to be performed in the network, wherein the one or more actions are based on the predetermined reward, obtain updated performance monitoring data from the network subsequent to the one or more actions to determine an updated state of the network, and continue causing the one or more actions to be performed in the network based on the current state and the updated state.

In a further embodiment, a non-transitory computer-readable medium including instructions that, when executed, cause a processor to perform the steps of obtaining performance monitoring data from a network which operates and generates the performance monitoring data which reflects a current state of the network; responsive to a predetermined reward which quantifies minimizing or maximizing an aspect in the network for Reinforcement Learning, causing one or more actions to be performed in the network, wherein the one or more actions are based on the predetermined reward; obtaining updated performance monitoring data from the network subsequent to the one or more actions to determine an updated state of the network; and continuing the causing the one or more actions to be performed in the network based on the current state and the updated state.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
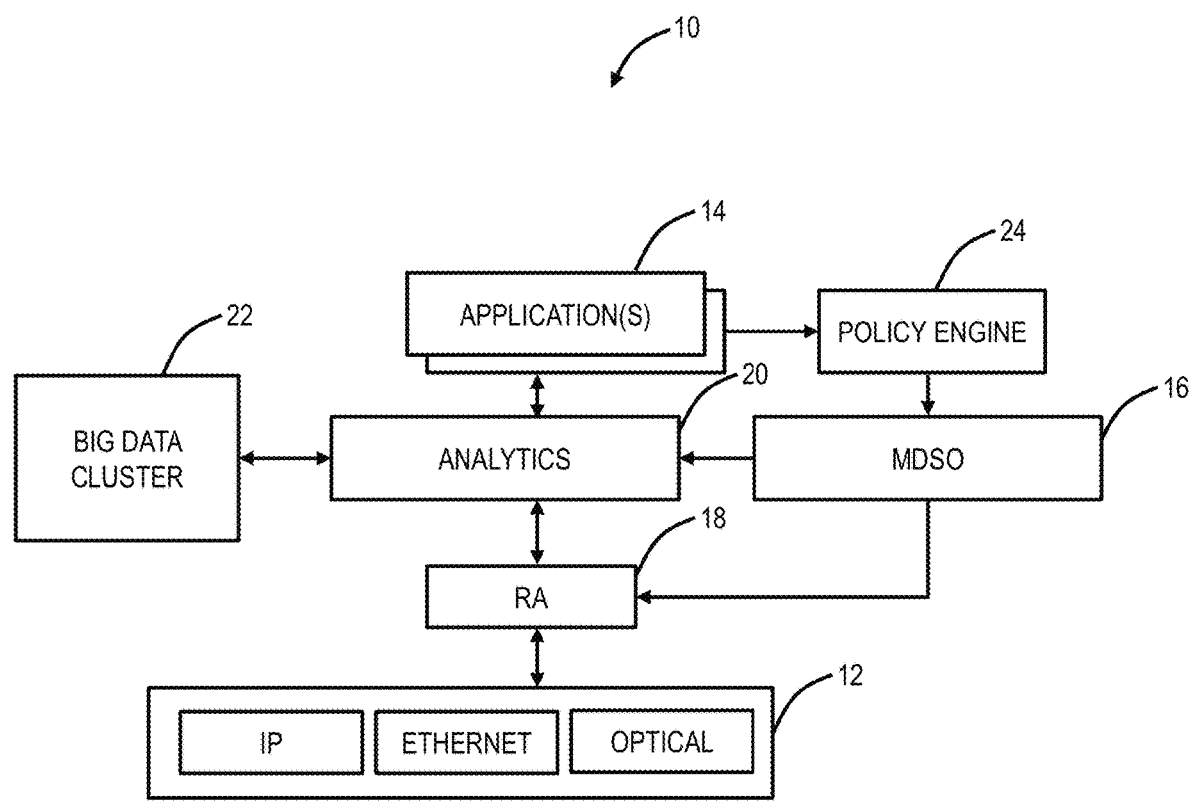
FIG. 1 is a block diagram of a Reinforcement Learning (RL) system communicatively coupled to a network for control thereof.

In various embodiments, the present disclosure relates to Reinforcement Learning (RL) for autonomous telecommunications networks. In a closed-loop SDN network, RL can be applied using various software applications to learn how and when to perform network actions to adapt to changing network/policy conditions and to maintain the network in a near-optimal state. The optimal state can be defined as one minimizing some defined cost function. For example, RL can be used in packet-optical telecommunications networks. In some embodiments, systems and methods can use network simulations to train RL packet-optical applications in simulated environments, before going live. In other embodiments, the systems and methods can use imitation learning to train the RL packet-optical applications with historical data, before going live. Once trained, the RL packet-optical applications can be used to operate large and complex networks.

The approaches described herein provide a new paradigm in configuring network applications. An operator only need specify the cost (or reward) associated with particular network metrics or events, the list of actions allowed to be performed on the network, and the list of metrics to characterize the network state. For example, in a packet network, the costs and rewards may include −10 for dropping packets at strategic ports, −20 for a service to be on a secondary path, and +10 for keeping a service latency below some Service Layer Agreement (SLA) value. The allowed actions may include: doing nothing, adjusting the bandwidth allocated to a service, or re-routing a service to a secondary path. The metrics describing the network state may include the transmitted and received bytes at various ports, the latency of each service and the date and time of day.

Of note, the operator does not need to determine the optimal settings of the network parameters and does not need to implement if { . . . } else { . . . } rules to control the network actions. These are learned automatically by the RL packet-optical application, which simplifies network operations significantly. To influence the network settings manually, the operator can modify the RL cost function at any point in any time, which will result in the network converging to a new optimal state. For instance, the operator may decide to raise the cost of dropping packets from high-priority services or to decrease the cost of being on a secondary path during certain times of the day.

In another embodiment, the RL packet-optical application can be capable of learning when/how to adjust bandwidth profiles and when/how to re-route services of high and low priority in a packet network, in the presence of varying traffic patterns, using RL. For example, the costs can be −10 for dropping packets on low-priority service, −20 for dropping packets on high-priority service, and −10 for any service to be on the secondary path. The actions can be, for each service, do nothing, set bandwidth to 1G, 4G, 10G, or some other value, or re-route to (pre-defined) primary or secondary path. The state can be the received (Rx) bytes of each service at strategic ports and the current path of each service.

In an embodiment, the optimal policies defining what actions to take for each state can be learned offline (e.g., through simulated data, through historical data, or a combination thereof). This can include developing a state-transition probability matrix (s, s'), and then applied online on a live network. This paradigm of reward, state, and action allows machine learning to drive network operation. Again, static configurations of if . . . then . . . else require expert knowledge in advance which is often lacking and which does not necessarily drive the network in an optimal manner.

RL System

FIG. 1 is a block diagram of an RL system 10 communicatively coupled to a network 12 for control thereof. Again, the RL system 10 is configured to leverage the concept of Reinforcement Learning (RL) to enable self-driving autonomous networks. With the RL system 10, software applications 14 can learn when and how to perform actions on the network elements in the network 12 in order to reach an optimal state.

The RL system 10 includes an orchestration/controller platform 16 which communicates to the network 12 via Resource Adapters (RA) 18. The orchestration/controller platform 16 can be a Multi-Domain Service Orchestration (MDSO) platform or a Manage, Control, and Plan (MCP) platform. The MDSO platform can be an open and vendor-agnostic software application that allows for rapid creation, deployment, and automation of the end-to-end delivery of services across both physical and virtual networks. The RL system 10 further includes analytics 20 which can provide input data telemetry (e.g., Performance Monitoring (PM) data, statistics, etc.), a big data cluster 22 for data storage and processing, and a policy engine 24.

The telemetry is performed by custom Resource Adapters (RA) 18 that know how to communicate with the network devices in the network 12 and is complemented by data acquisition software located in the Network Management System and/or the Analytics platform. The data storage and processing can occur in the big data cluster 22 and is driven by instructions from the applications 14. The applications 14 are where all the RL analysis is performed. The applications 14 generate the Machine Learning (ML) insights about the state of the network 12. Finally, the policy engine 24 can be programmed to execute actions on the SDN-aware devices via the controller (MCP) or the orchestrator (MDSO) 16.

The network 12 can operate at Layer 0 (photonic, Dense Wave Division Multiplexing (DWDM), Layer 1 (Time Division Multiplexing (TDM) such as Optical Transport Network (OTN), Layer 2 (Ethernet, Multiprotocol Label Switching (MPLS), etc.), Layer 3 (Internet Protocol), and the like. The network 12 can be formed via network elements or nodes which can be configured to provide services at the various Layer. In an embodiment, the network element can be a nodal device that may consolidate the functionality of a multi-service provisioning platform (MSPP), digital cross-connect (DCS), Ethernet and Optical Transport Network (OTN) switch, DWDM platform, etc. into a single, high-capacity intelligent switching system providing Layer 0, 1, 2, and/or 3 consolidation. In another embodiment, the network element can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the network element can be any system with ingress and egress signals and switching of packets, channels, timeslots, tributary units, wavelengths, etc.

As can be noticed in FIG. 1, the RL system 10 forms a "closed loop" in which the telemetry data is pulled from the network devices (network elements) and analyzed by the applications 14 at regular intervals (e.g., every minute), on demand, at varying frequencies, etc. The result of each analysis can trigger an action on the network 12, or not, depending on the situation. As is described herein, an action includes a configuration in the network, in the network elements, etc. to perform some function.

In various embodiment, RL includes defining costs and rewards to quantify network actions, determining allowed network actions, and defining metrics describing a state of the network 10; obtaining network data to determine a current state based on the defined metrics; and determining one or more of the network actions based on the current state and based on minimizing the costs and/or maximizing the rewards. That is, RL includes rewards/costs which set the objective/goal, a state which defines where the network 10 currently is relative to the objective/goal, and network actions which are used to drive the state towards the objective/goal.

Reinforcement Learning

In general, RL includes seeking to learn what to do given a problem, i.e., an optimal mapping from its current state to some action, so as to maximize the reward signal in the long run. Often times, an application 14 does not have any a priori knowledge of its environment and must discover which actions yield the most reward by trying them out. This leads to the trade-off between exploration and exploitation. The application 14 must exploit what it already knows in order to obtain rewards, but also needs to explore in order to make better actions in the future.

The applications 14 implement reinforcement level algorithms applied to the networking space. At the high level, as documented in (1) Ian Goodfellow et al, "Deep Learning", available online at www.deeplearningbook.org, and (2) David Silver et al., "Mastering the game of Go without human knowledge," Nature 550.7676 (2017): 354, the contents of each are incorporated herein by reference, these processes require a cost function, a parametrization of the network state, and a list of possible actions.

At each iteration of the above closed-loop, the state of the network s is determined from the telemetry data. This determines a value of the reward r(s) (also referred to as "cost") associated with that state. Then. the RL process determines the action a that can be taken on the network in order to bring it to the next state s', which is expected to get a better or equal reward r(s'). Note that "doing nothing" is a valid action. When doing so, the RL process updates the value Q(s, a) as follows:

$$Q(s, a) \to (1 - \alpha)Q(a, s) + \alpha(r + \gamma)\max_{a'} Q(s', a')$$

After several iterations, the map of Q(s, a) becomes an accurate description of the network states and their possible best actions. Parameter α determines the relative weight of newer states with respect to older ones. This configures how quickly the RL can adapt to changing conditions versus how much it will remember its lessons from the past when getting to choose an action. A valid action a in a given state s is chosen with probability according to the Boltzmann Distribution:

$$\frac{e^{Q(s,a)/T}}{\sum_{a'} e^{Q(s,a')/T}}$$

The choice of hyper-parameter T can be varied depending on how much exploration is desired versus exploiting the greedy action. It is best practice to start with a large T, allowing different actions to be chosen. As T tends to 0, we ensure choosing the best possible action.

Figure 2:
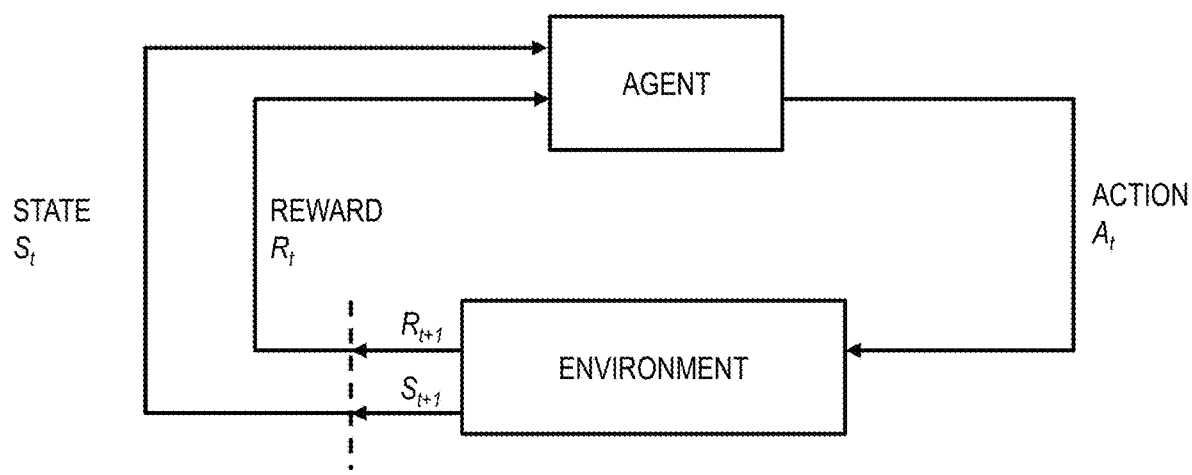
FIG. 2 is a diagram of an RL process.

FIG. 2 is a diagram of an RL process. At each time step t, the application 14 needs to select an action $A_t$ provided its current state $S_t$. The choice of action will move the application 14 to the next state $S_{t+1}$ and more importantly, provide a numerical reward $R_{t+1}$. The goal is to determine a policy, which is a mapping from states to actions, which maximizes the reward it receives in the long run.

Figure 3:
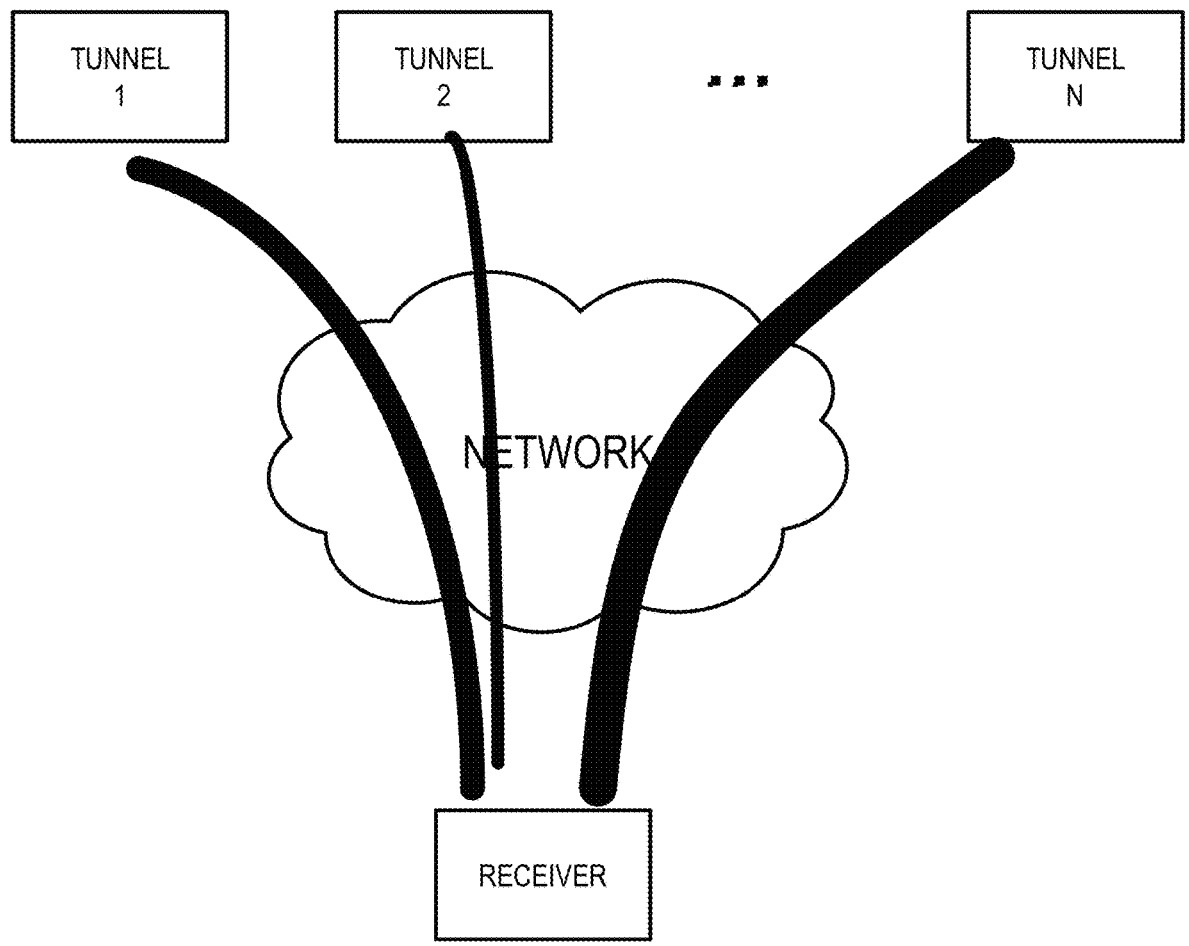
FIG. 3 is a network diagram of the RL process applied in the network to Labeled Switched Path (LSP) tunnel traffic/allocation profiles.

FIG. 3 is a network diagram of the RL process applied in the network 12 to Labeled Switched Path (LSP) tunnel traffic/allocation profiles. In an embodiment, the RL process can be used to set the traffic/allocation profiles of LSP tunnels in an MPLS network. A label-switched path (LSP) is a unidirectional path through the MPLS network. An LSP can be established via any signaling protocols such as Label Distribution Protocol (LDP), Resource Reservation Protocol (RSVP), or Border Gateway Protocol (BGP). LSPs are established by the network operator for a variety of purposes, such as to create network-based IP virtual private networks or to route traffic along specified paths through the network.

In an embodiment, the State (S): describes the current LSP tunnel traffic/allocation profiles: i.e., (1G, 5G, 2G)/(2G, 4G, 2G). The Action(A): modifies the allocation profile for the tunnels and moves the network 12 to the next state, such as Increase/Decrease tunnel allocations (or do nothing), i.e., (1G, 5G, 2G)/(2G, 4G, 2G)+(1G, 5G, 2G)/(1G, 5G, 2G).

The Priority: describes the relative priority of traffic for each tunnel—i.e., (5, 5, 5)→each tunnel has priority 5 (uniformly treated), and, i.e., (1, 5, 10)→the third tunnel is given highest priority (at the expense of others). The Reward/Cost(R)–proportional to the number of dropped packets and the corresponding priority, i.e., dropped_traffic·priority. The Policy(π): maps a particular state to an action.

$\pi: S \to A$

Often times the environment and rewards are known, whether it is pre-defined or estimated via sampling (exploration). In the case where the next state is only conditioned on the current state, one can formulate the problem as a finite Markov Decision Process. The dynamics of a finite MDP are defined by its state and actions sets, and the one-step transition probabilities:

$$Pr\{S_{t+1} = s', R_{t+1} = r \mid S_t = s, A_t = a\}$$

For example, the objective is to maximize (or minimize) the total discounted accumulated reward for each time step—

$$G_t = R_{t+1} + \gamma R_{t+2} + \gamma^2 R_{t+3} + \ldots = \sum_{k=0}^{\infty} \gamma^k R_{t+k+1}$$

At any time step t, the goal is to maximize expected cumulative rewards going forward. Adding a discount factor 0<γ<1 guarantees convergence and also provides intuition about the interplay between short and long-term goals.

This can be generalized for each state via a value function given some policy ☐ is followed.

$$v_\pi(s) = E\pi[G_t \mid S_t = s]$$

The value function is also known as Bellman's equation, which can be solved using the Decision Process (DP) techniques (optimal control), Value iteration, Policy Iteration. Imagine sitting down an eating a piece of cake; the optimal action would be to take another bite (to receive a good feeling signal) if gamma is small. But if gamma is large, the negative long-term consequences weigh more, and one would stop eating in order to avoid the negative consequences.

Thus, it is desired to find the optimal policy which maximizes the value of each state:

$$v_*(s) = \max_\pi v_\pi(s) \forall s \in S$$

This can be a model-free reinforcement learning technique. The application 14 has no idea of its environment dynamics and learns at each step. The application 14 heavily relies on exploration at the beginning in order to visit as many different states as possible and can adapt to changing environments which in turn creates optimal policies. For any finite MDP (Markov Decision Process)—Q-learning eventually finds an optimal policy—

$$Q(s, a) \to (1 - \alpha)Q(a, s) + \alpha(r + \gamma) \max_{a'} Q(s', a')$$

FIGS. 4-11 are grids illustrating the value function with various different values. RL utilizes grids to describe the state and transitions. In the grids described in FIGS. 4-11, the arrows illustrate state transitions, the values of the X and Y axis can be generic and represent the states, e.g., configurations of the network 10 and the network elements. The shading inside the grid represents the rewards with a higher value (darker shading) indicative of higher rewards.

Figure 4:
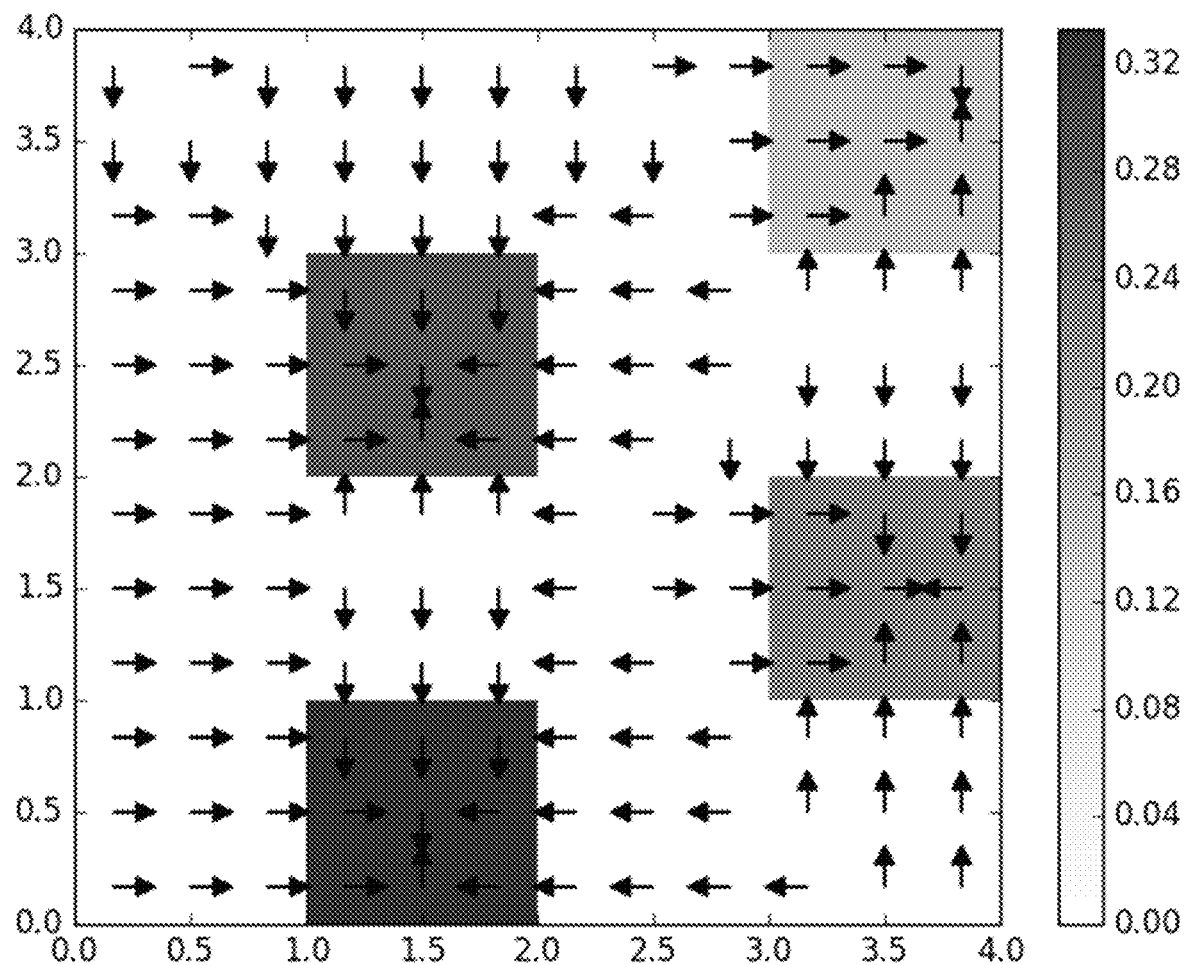
FIGS. 4-11 are grids illustrating the value function with various different values.
Figure 5:
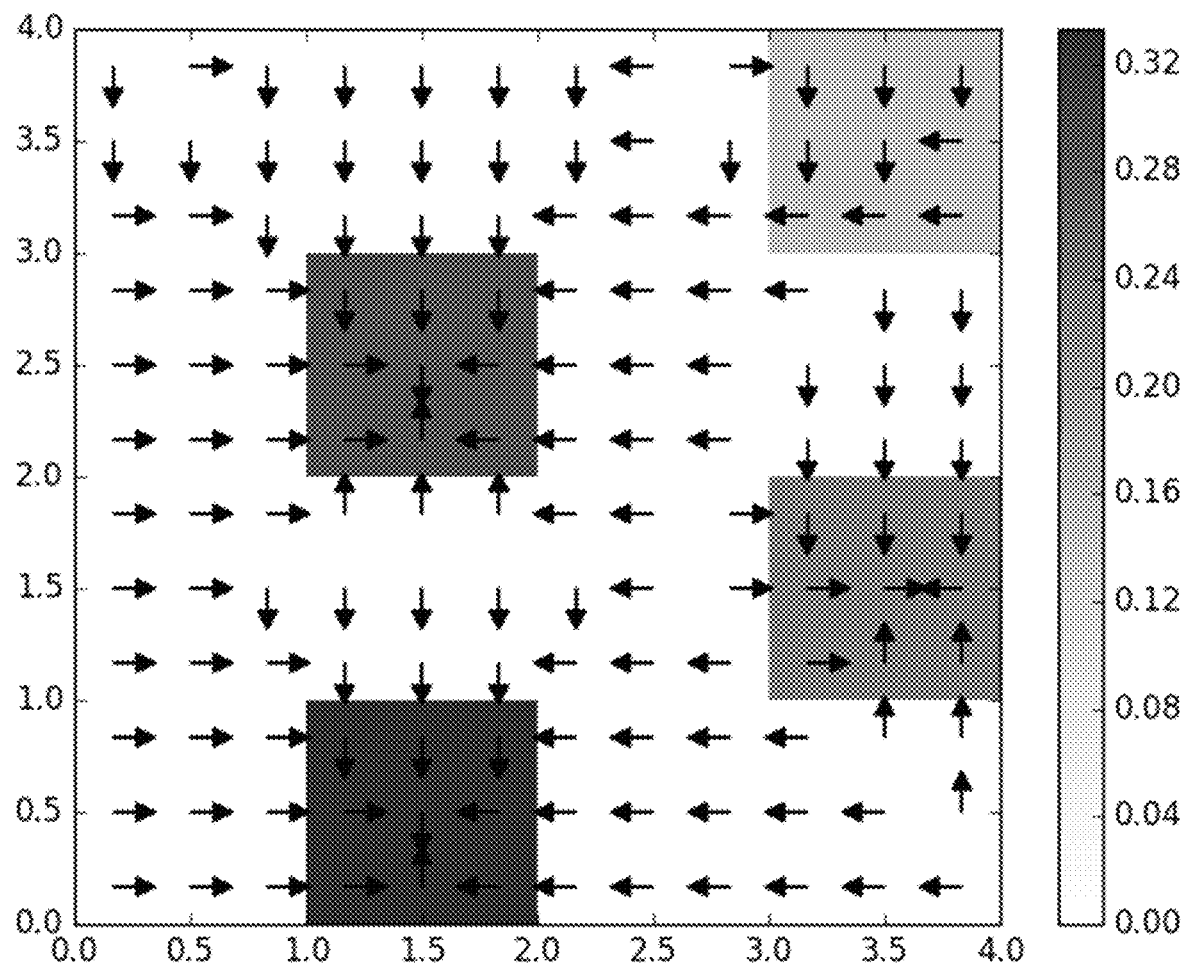
Figure 6:
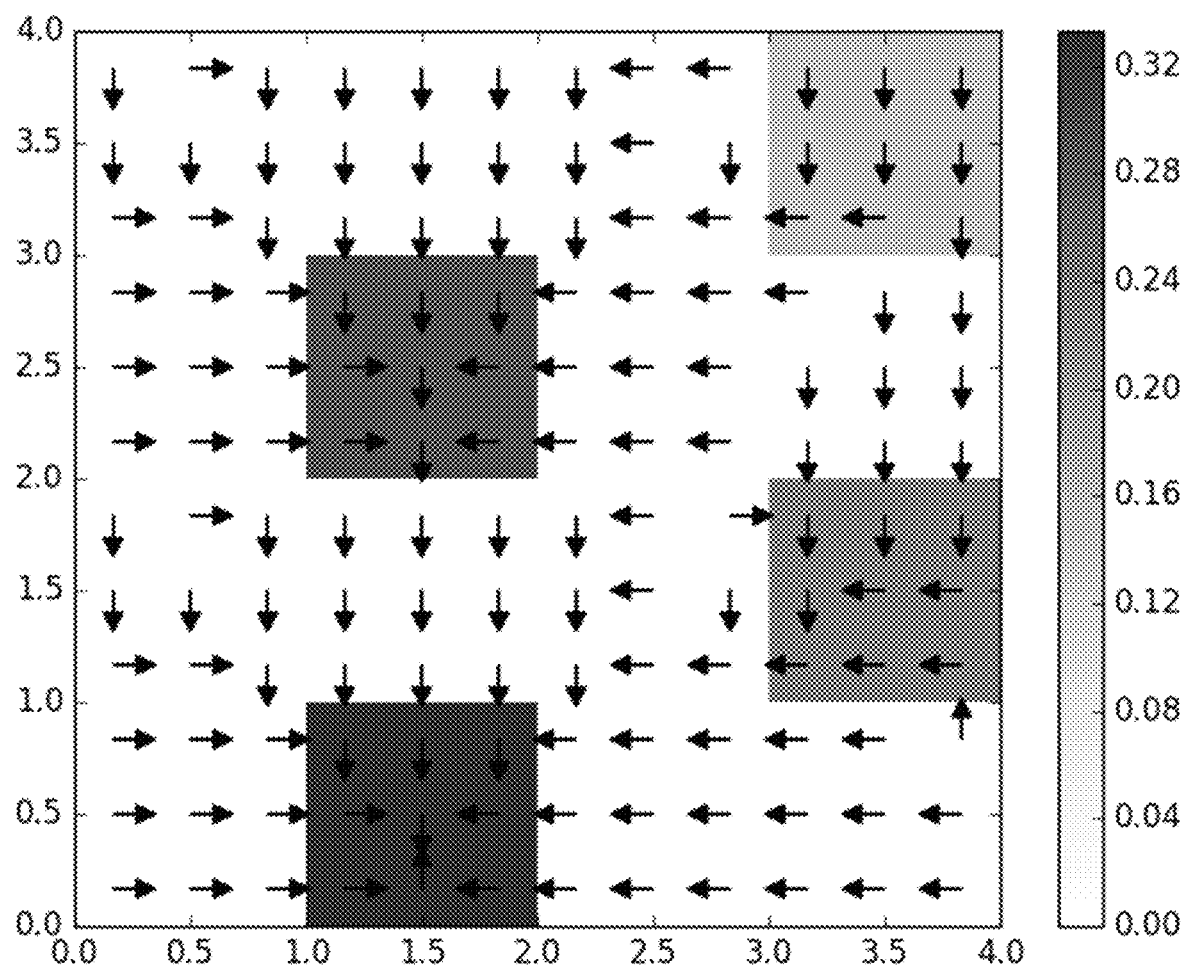

FIG. 4 illustrates γ=0.8, and the best policy is to go to the nearest reward, and there is no long-term planning. Specifically, at any starting point, the RL process drives to the nearest reward, not necessarily the highest value reward. FIG. 5 illustrates γ=0.9 showing a stronger desire to find long-term rewards. FIG. 6 illustrates γ=0.99 showing long-term planning wherein the state transitions proceed to the highest reward value.

In accordance with another implementation, Inverse RL (Apprenticeship learning) aims to recover the reward function from observing some expert behavior and associate trajectories. Learning specific behavior given a particular state does not generalize well. The reward function provides the most succinct transferable definition of a task. One can find a reward function R* such that:

$$E\left[\sum_{t=0}^{\infty} \gamma^t R^*(S_t) \mid \pi^*\right] \geq E\left[\sum_{t=0}^{\infty} \gamma^t R^*(S_t) \mid \pi\right] \forall \pi$$

Figure 7:
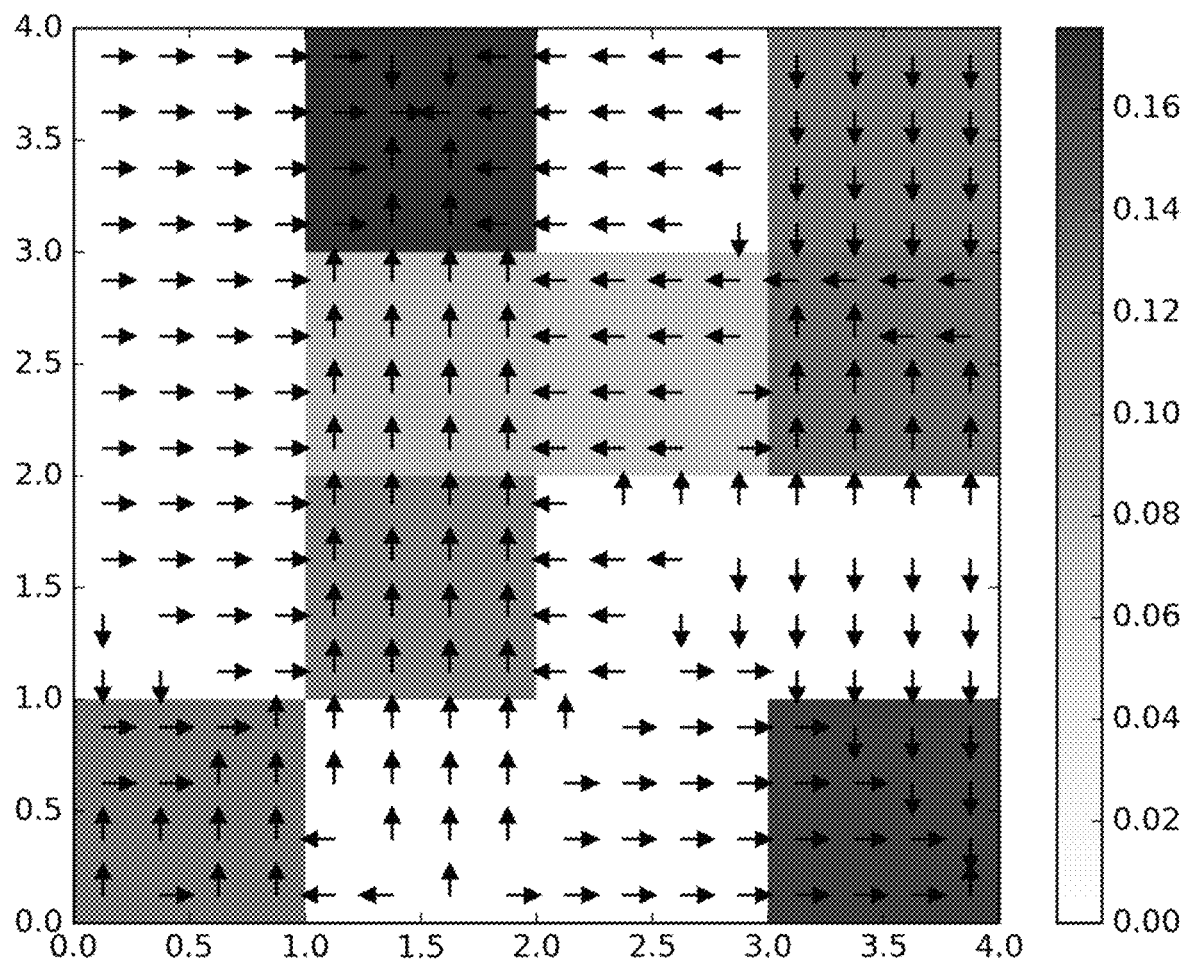
Figure 8:
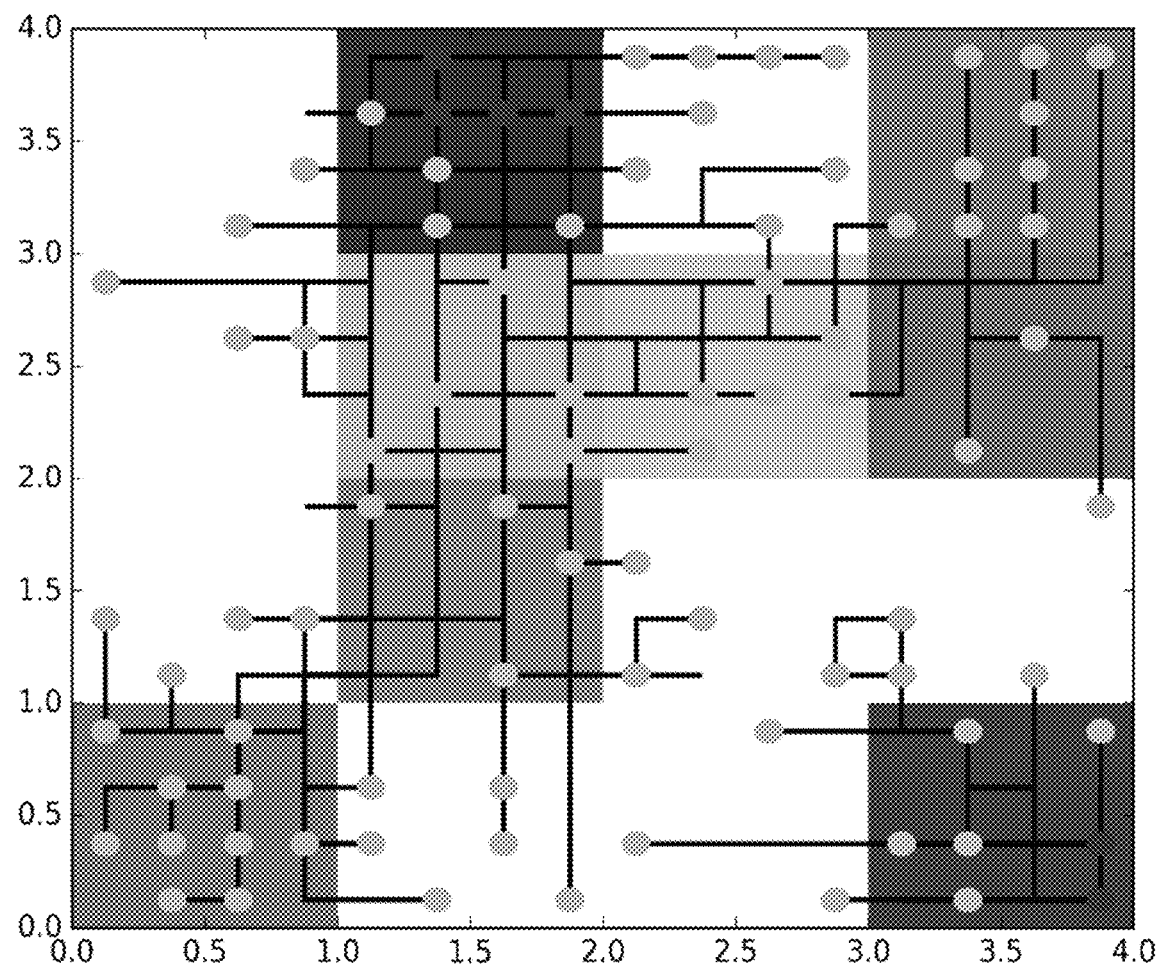
Figure 9:
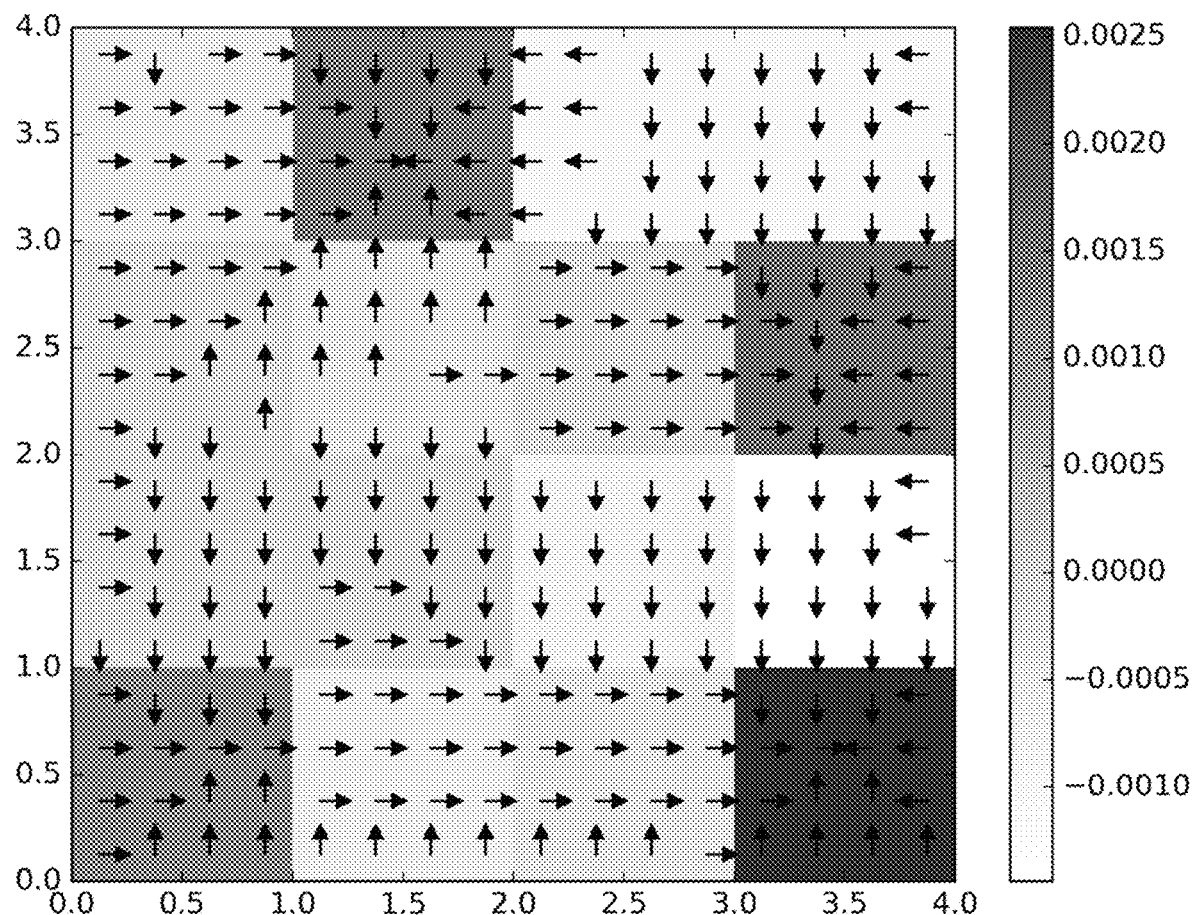
Figure 10:
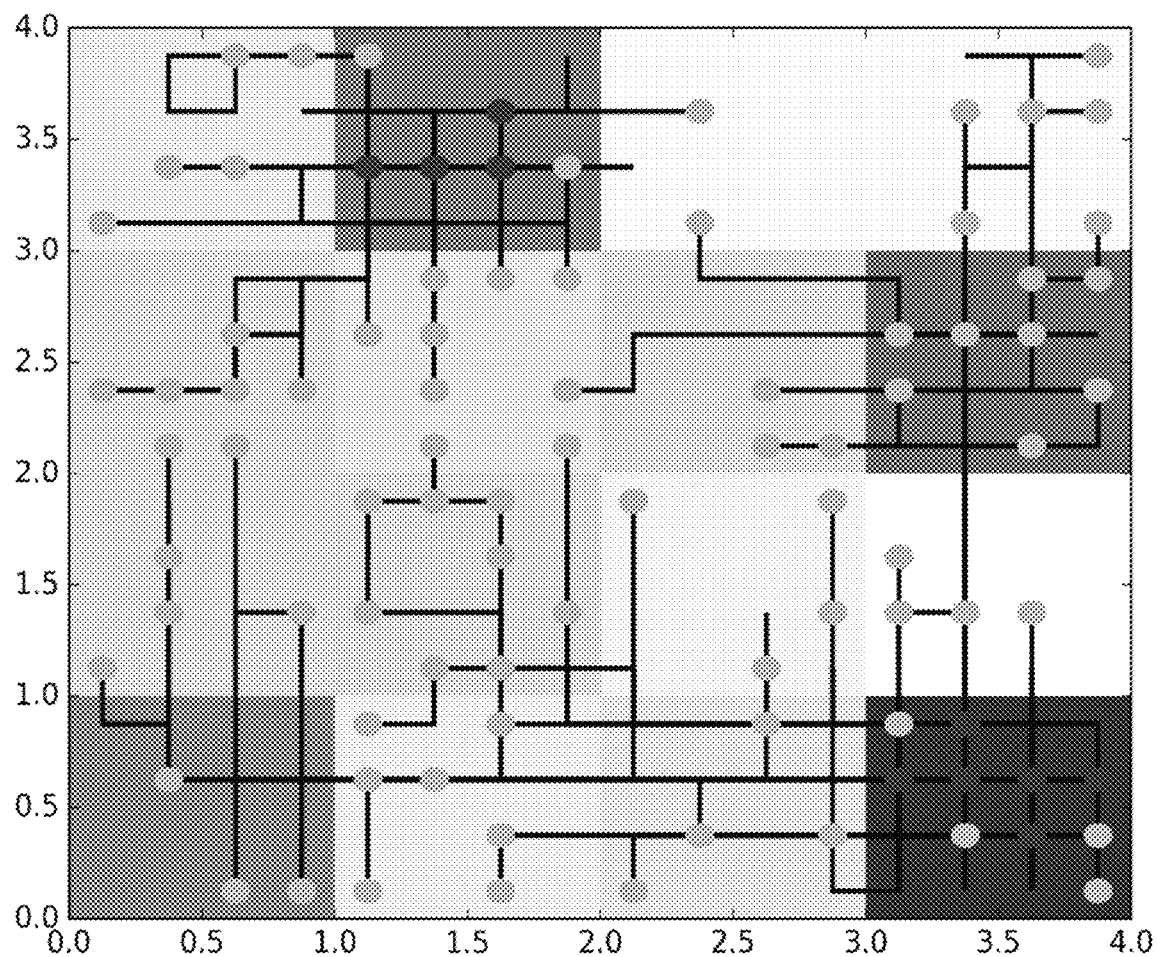
Figure 11:
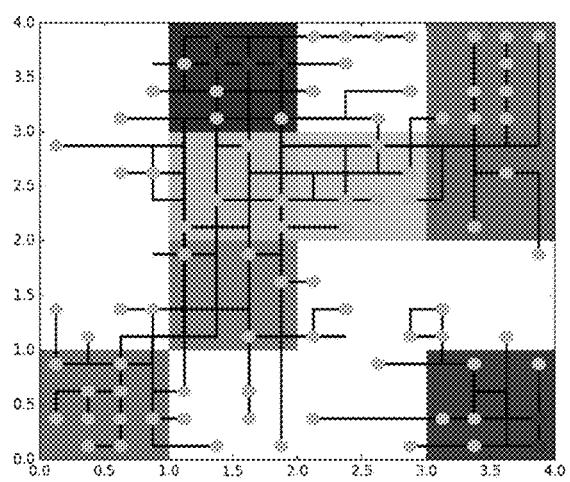
Figure 11:
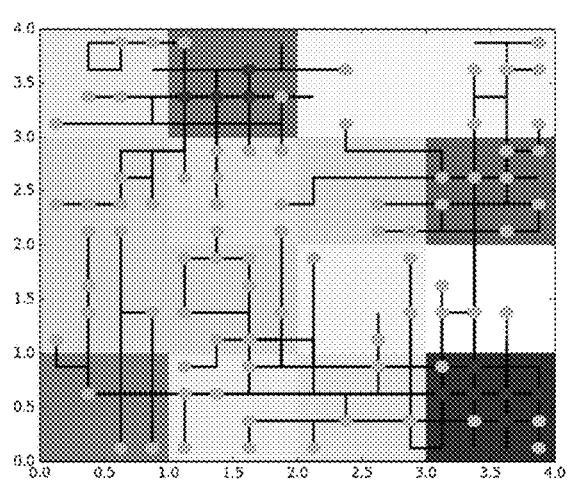

FIG. 7 illustrates a grid of expert policy and FIG. 8 illustrates expert trajectories. FIG. 9 illustrates a grid of learner policies and FIG. 10 is a grid of learner trajectories. FIG. 11 illustrate a comparison of the expert trajectories and the learner trajectories. The inverse RL in FIGS. 7-11 are described in Pieter Abbeel et al. "Apprenticeship Learning via Inverse Reinforcement Learning," Proceedings of the twenty-first international conference on Machine learning. ACM, 2004, the contents of which are incorporated herein by reference.

Network Element

Figure 12A:
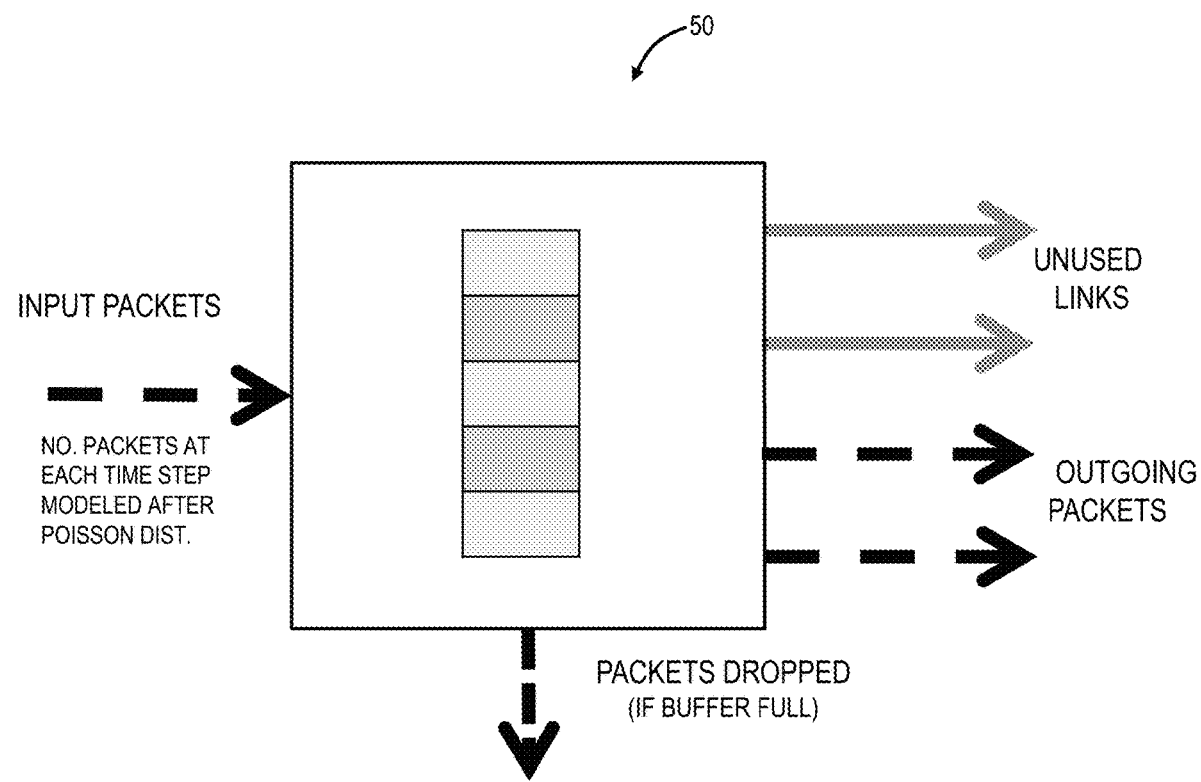
FIG. 12A is a block diagram of a network element in the network implementing RL processes via a packet application.
Figure 12B:
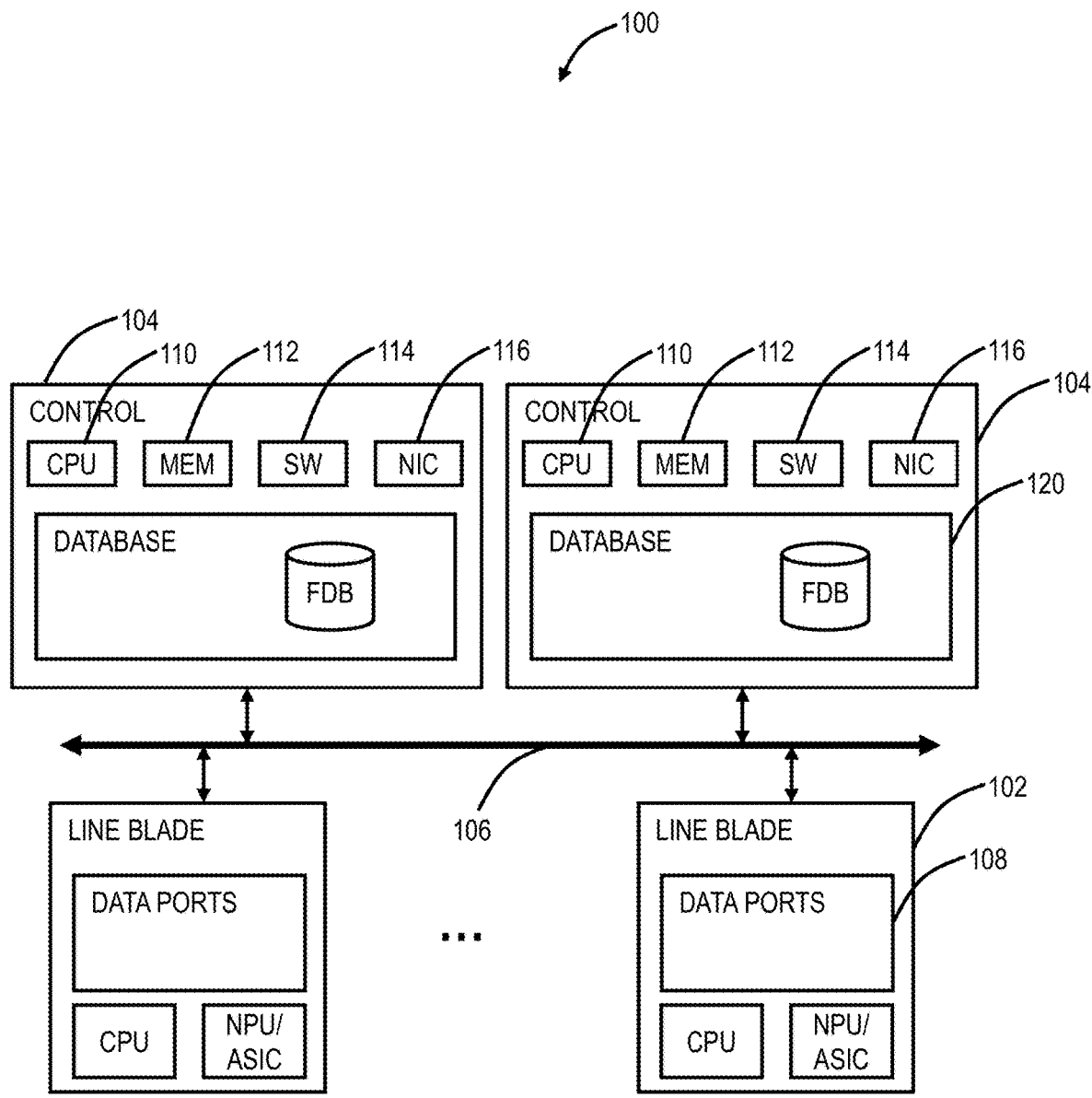
FIG. 12B is a block diagram of an implementation of a network element.
Figure 12C:
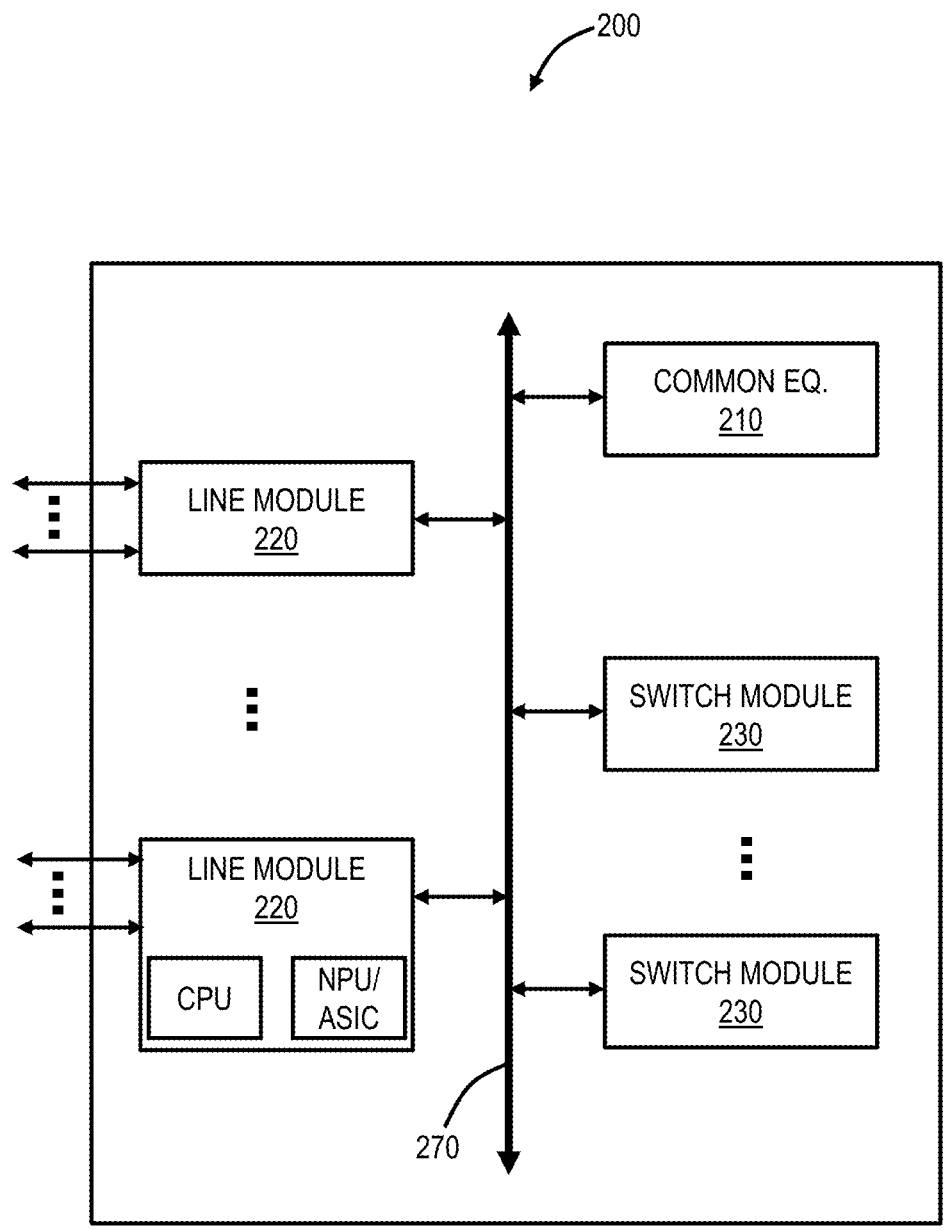
FIG. 12C is a block diagram of another implementation of a network element.

FIG. 12A is a block diagram of a network element 50 in the network 12 implementing RL processes via a packet application 14. In this example, the state can be described the number of ingress/egress packets and the number of open egress links. The actions can include opening/closing the egress links or doing nothing. The cost can include opening/closing a link, packets dropped/waiting, etc. Additional details of the state, actions, and rewards are described herein. FIGS. 12B and 12C illustrate example implementations of a network element in the network 10.

FIG. 12B is a block diagram of an implementation of a network element 100. In this embodiment, the network element 100 is a packet network switch, but those of ordinary skill in the art will recognize the systems and methods described herein can operate with other types of network elements and other implementations. In this embodiment, the network element 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the network element 100. Each of the blades 102, 104 can include numerous electronic devices and optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the network element 100 out by the correct port 108 to the next network element 100. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the network element 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB). In this embodiment, the network element 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the network element 100.

FIG. 12C is a block diagram of another implementation of a network element 200. For example, the network element 100 can be a dedicated switch whereas the network element 200 can be a multiservice platform. In an embodiment, the network element 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the network element 200 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the network element 200 can be any system with ingress and egress signals and switching of packets, channels, timeslots, tributary units, wavelengths, etc. In the context of the systems and methods described herein, the network element 200 includes packet switching with metering in addition to any other functionality.

In an embodiment, the network element 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), an element management system (EMS), or the like. The network element 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the network element 200. In an embodiment, the line modules 220 can form ingress and egress switches with the switch modules 230 as center stage switches for a three-stage switch, e.g., a three-stage Clos switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the network element 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity, etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In the context of the systems and methods described herein, the network element 100 includes packet metering which can be performed by one or more meters, implemented in circuitry and located on the line blade 102, the control blade 104, in the switching fabric at some point, etc. Similar to the network element 100, the network element 200 includes packet switching through the line modules 220 and/or the switch modules 230. The network element 200 includes packet metering which can be performed by one or more meters, implemented in circuitry and located on the line modules 220, the switch modules 230, the common equipment 210, etc. Specifically, the process 50 can be implemented in circuitry, logic, hardware, firmware, software, and/or a combination thereof in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an example type of node. For example, in another embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein.

RL Training

As with all machine learning, the RL process requires training. In this case, the learning provides increasingly accurate modeling of the network states and its mapping to optimal actions.

In a greenfield deployment (new network), the operator can first let the network operate with controlled traffic and without real customer traffic to let the RL learn by trial and errors in situ. If this is not possible, the RL process can learn from historical data using an imitation learning strategy. Alternatively, if available, the RL process can be trained using a network simulator.

User APIs

The users of the applications 14 are network operators. The applications 14 expose Application Programming Interfaces (APIs) that enable the user to define custom cost or reward functions, to specify a list of allowed actions that can be performed on the SDN-aware network elements, and a list input metrics that characterize the network state.

In Operation

Figure 13:
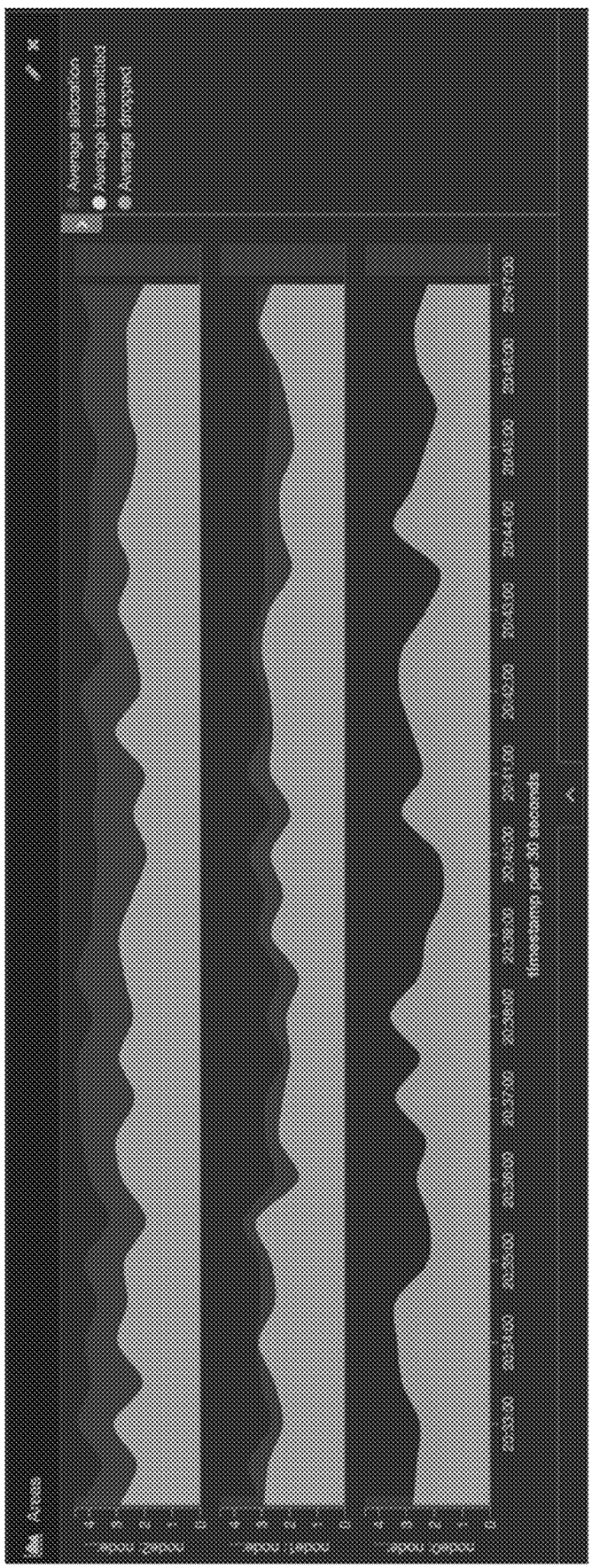
FIGS. 13-22 are graphs of LSP traffic for various use scenarios of the RL processes.

The foregoing describes a deployment scenario of the RL process using LSP tunnels in operation. FIG. 13 is a graph of LSP tunnel allocation. Specifically, FIG. 13 includes three graphs, each for a separate network element, and each graph illustrates averaged LSP tunnel allocation, averaged transmitted bandwidth, and averaged dropped traffic.

A script will train three separate models for three different service profiles. Training is important in any machine learning process. The closed-loop application 14 in the RL system 10 collects L2/L3 metrics, bandwidth profiles of all the LSP tunnels, as well as the current priorities of each service. For example, a particular service will send its data via an LSP tunnel. With enough data, the traffic flows/priorities of each service can be modeled which are then used to create an optimal policy (training phase). This policy is fed into the policy engine 24 at the orchestrate side which then decides how to adjust the bandwidth profiles of the LSP tunnels based on the current network snapshot.

After the policies have been trained and ready to create insights from the input.

By default, profile 1 ([5,5,5]) can be selected on startup for example, and data will start being pushed. The uniform profile means that for the three different services in the network, all are treated equally. Therefore, the policy is 'fair' and tries to allocate resources uniformly to the LSP tunnels (on average). There is no bias towards any one service.

Figure 14:
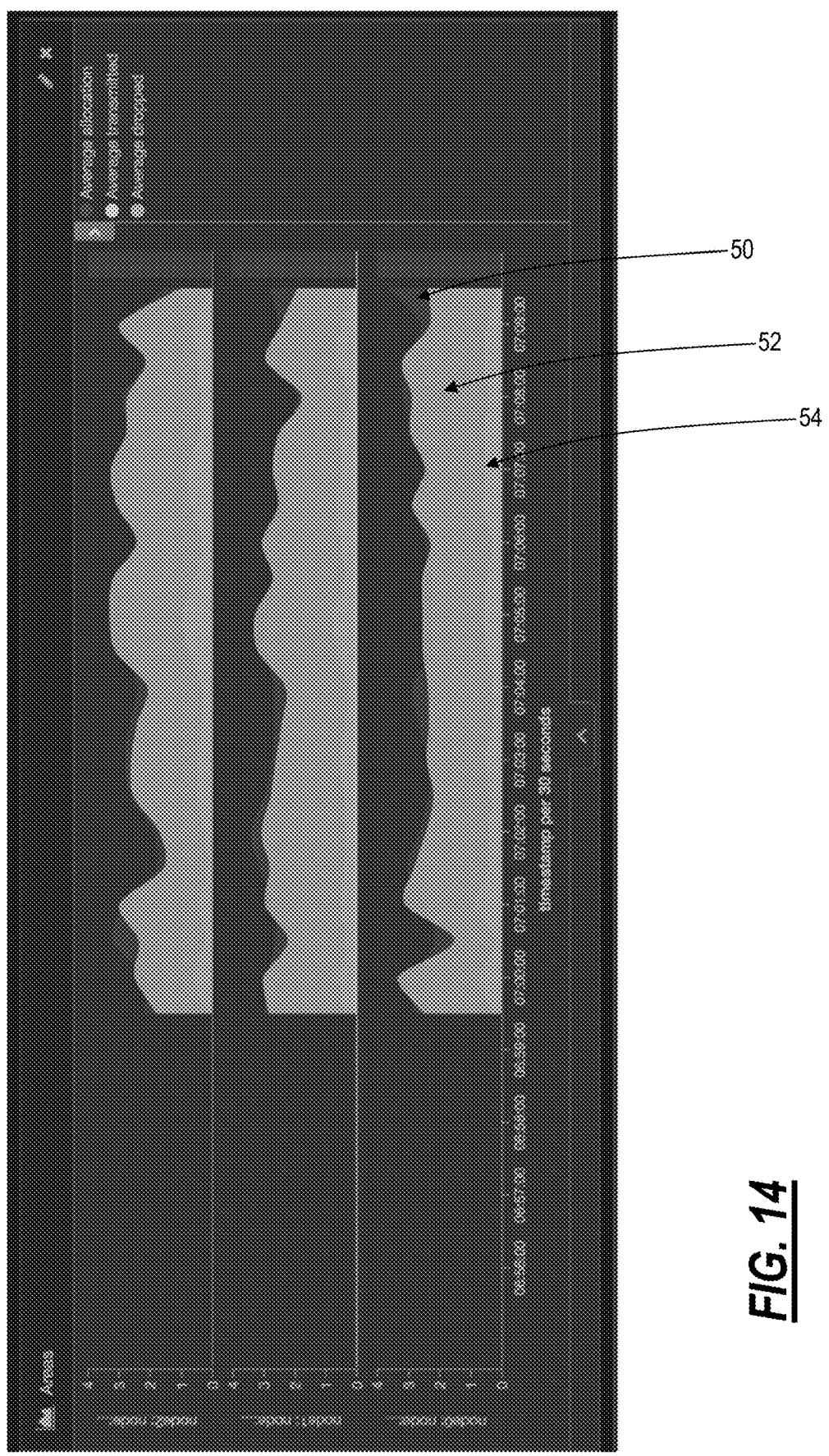

FIG. 14 is a graph of LSP Tunnel Allocation versus Transmitted (Requested) versus Dropped currently. Similar to FIG. 13, FIG. 14 includes the three graphs each for a separate network element. Line 50 illustrates how much bandwidth (Gbps) is allocated for a service (LSP tunnel width), Line 52 illustrates an amount of traffic (Gbps) the service wishes to transmit, and Line 54 illustrates an amount of traffic (Gbps) dropped as a result of under allocation.

In the uniform case, there is a consistency between the behaviors on all three services. The network cannot faithfully allocate the total amounts requested from each service, but it distributes its resources fairly. It is important to note that the network capacity is fixed and there will always be dropped packets if all services are sending peak traffic at the same time.

Figure 15:
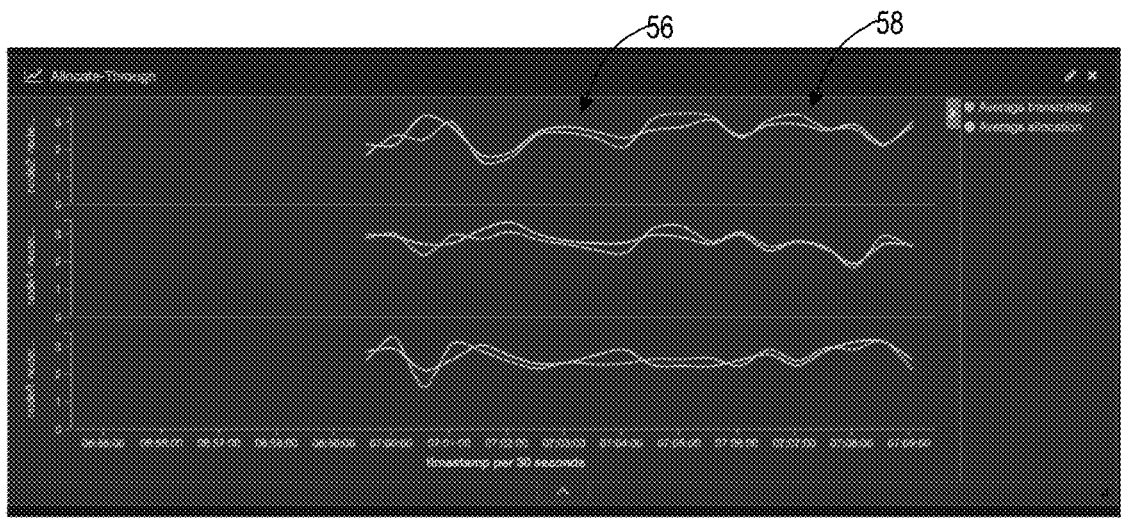
Figure 16:
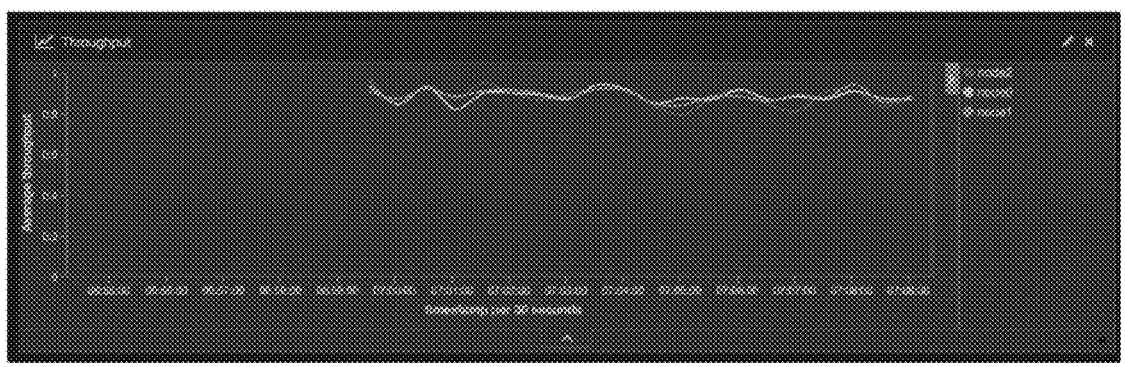
Figure 17:
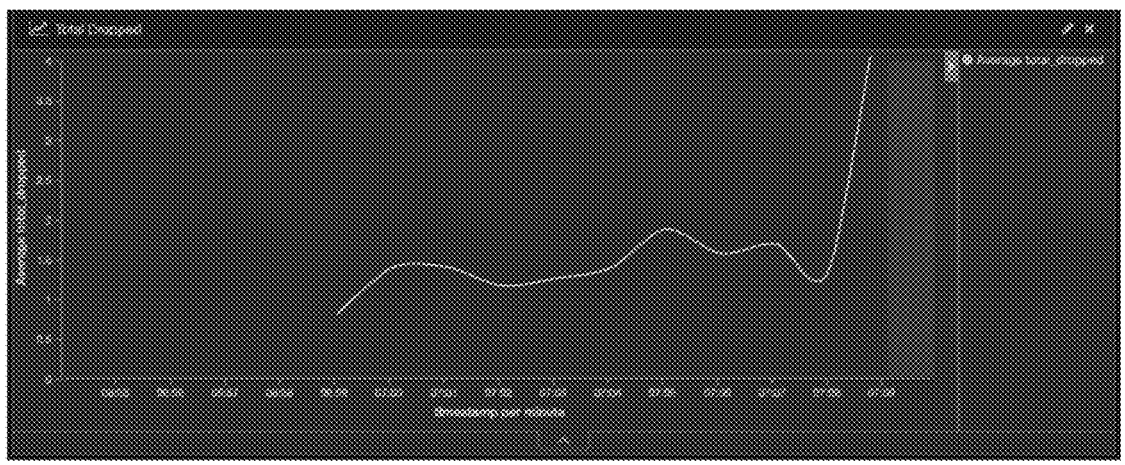

FIGS. 15-17 are various graphs based on the current settings. FIG. 15 is LSP Tunnel Allocation versus Transmitted (Requested). Line 56 is bandwidth allocated for that LSP tunnel and line 58 of the Amount transmitted (requested). FIG. 16 is a graph of Normalized (Rx/Tx) Throughput (Efficiency). This graph provides the efficiency of each service. If all of the requested bandwidth is allocated, then one would have an efficiency of 1. FIG. 17 is a graph of total dropped packets. Here this provides the total number of packets that have been dropped (Gbps) due to insufficient resources. It will be interesting to see how this graph changes when switching profiles using RL.

Next, the settings are switched to profile number 2 ([1,5, 10]). The higher the number, the higher the priority for that particular service (node), thus providing Low, Medium, High priority services.

Figure 18:
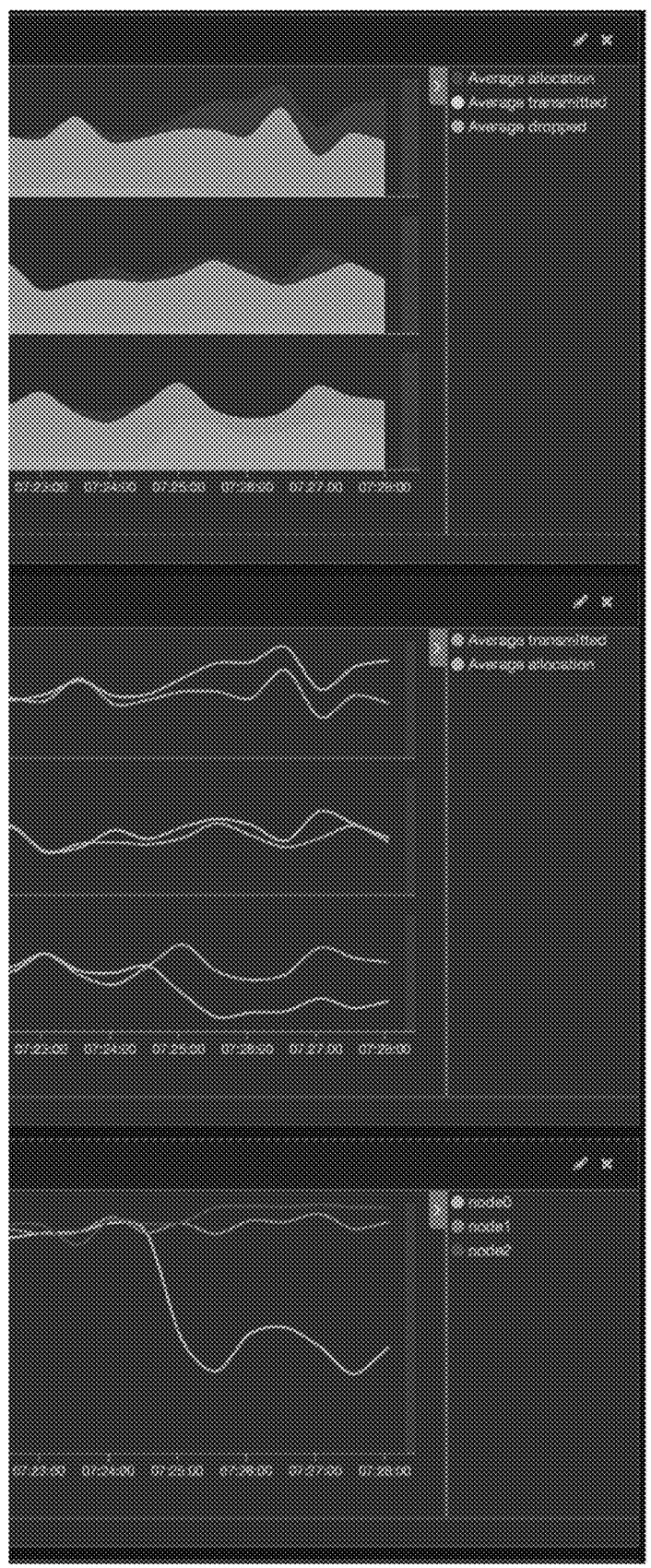

After switching profiles, transitions are observed on each graph as illustrated in FIG. 18. One can see the policy engine has now sensed different profiles for the services and adjusts the LSP tunnels accordingly. From these graphs, one can see that for service 3 (node2), there is an increased allocation for that LSP tunnel in order to improve its service. Because the capacity in the network is fixed, service 1 (node0) will suffer and essentially turns into a best effort service. Service 2 (node1) still has acceptable quality as seen by its efficiency. However, it is not tolerant against bursts of traffic.

Figure 19:
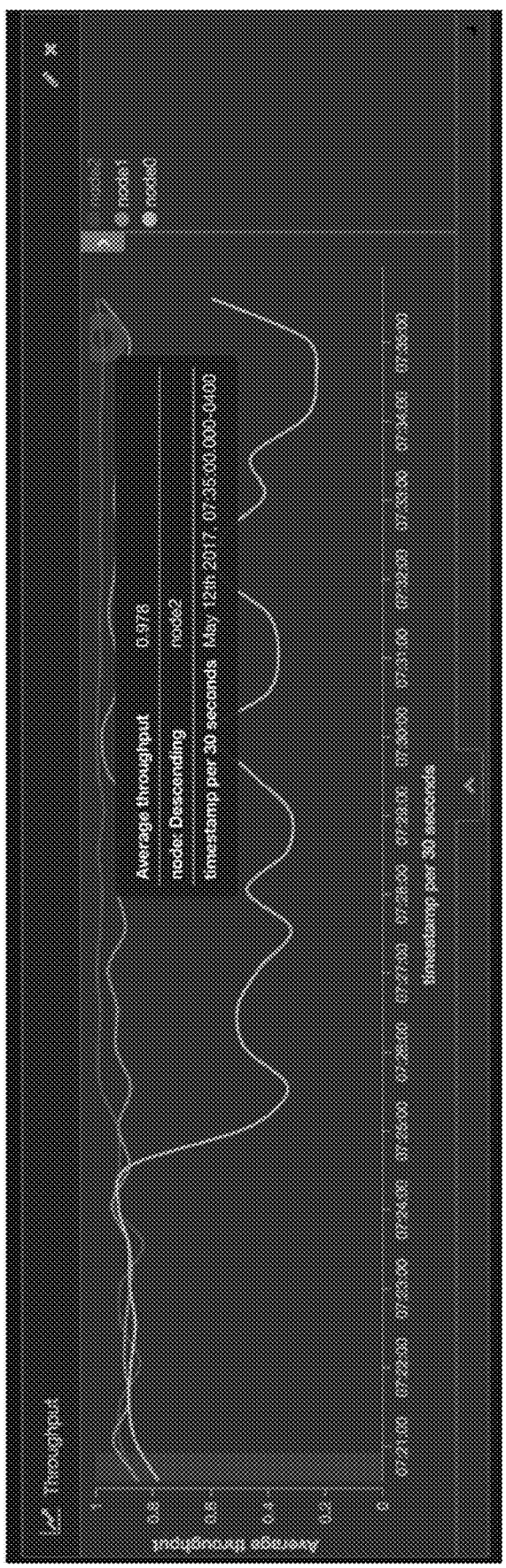

Note: Even though service 3 is favored, it will still drop packets during bursts of traffic as illustrated in FIG. 19. This can be confirmed by the small pink strip on the stacked areas graph, or also using the tooltip to verify that the efficiency is not 1.

Figure 20:
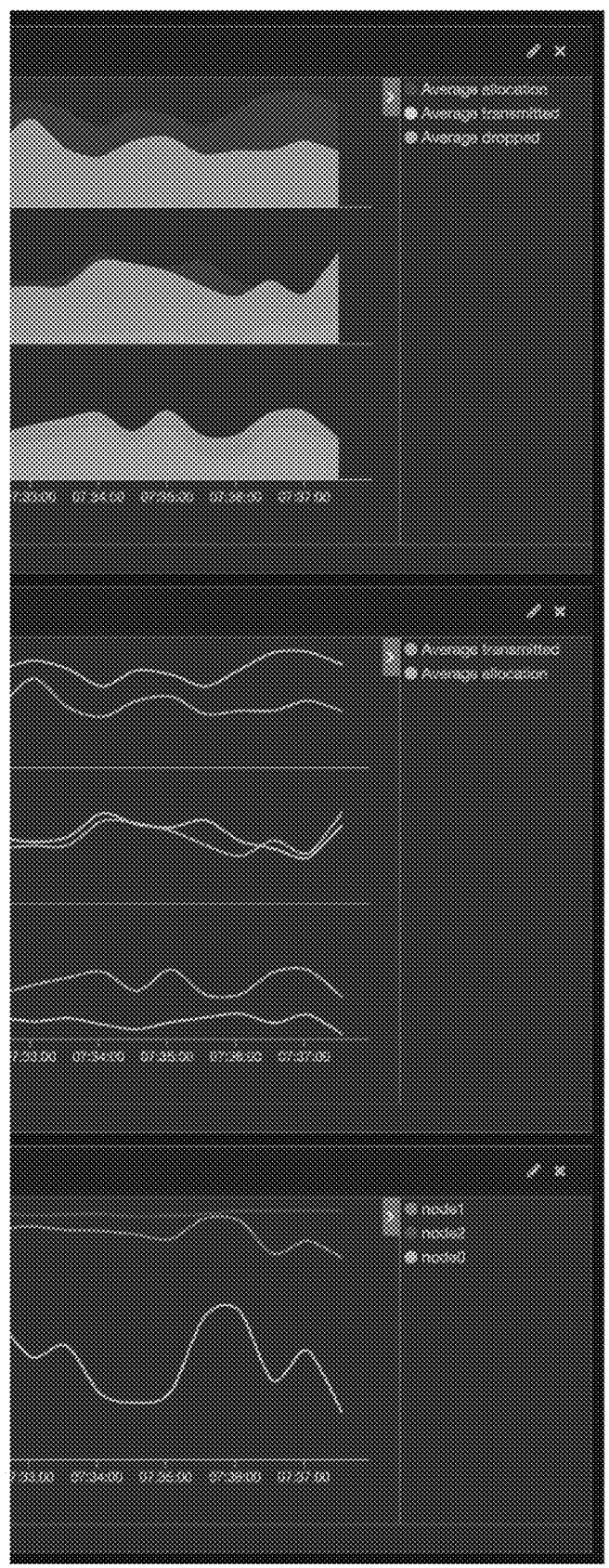
Figure 21:
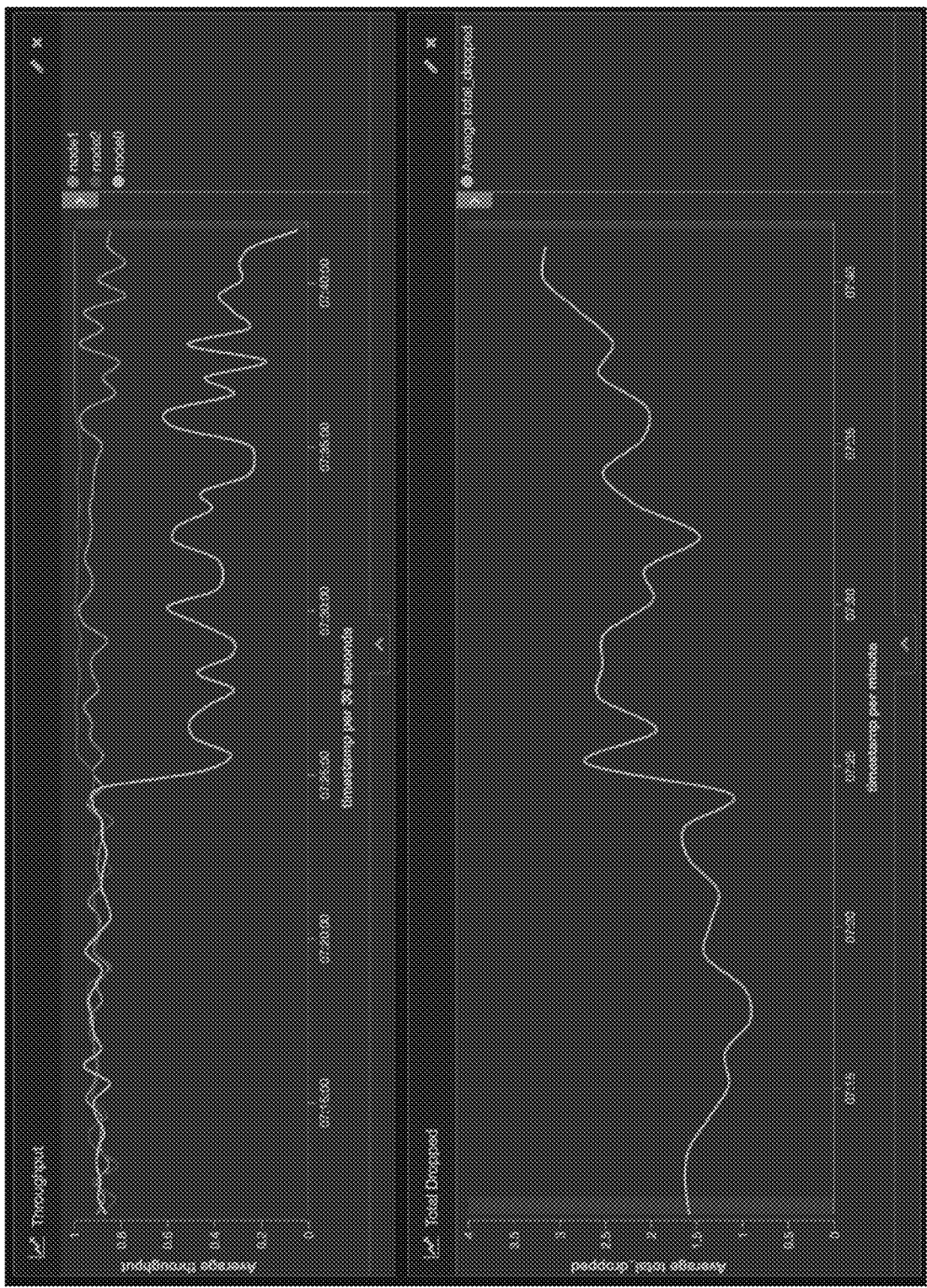

Next, high priority is set for service 3—profile 3 ([1,5, 100]):

In this case, the priority on service 3 dominates the other services, requiring an absolute efficiency of 1 (tolerant to all traffic bursts). From the graphs in FIG. 20, one can see that the gap between allocated and transmitted for service 3 has increased in order to allow for traffic bursts. FIG. 21 illustrates the total number of dropped packets in the network. From the graphs, the overall efficiency of the network is most high (optimal social welfare) when each service is treated the same. High efficiency is the same as minimizing the total number of dropped packets. Once services start to dominate at increasing priorities, even though they may get a better allocation, it is at the expense of less prioritized services, causing the average network efficiency to go down.

Figure 22:
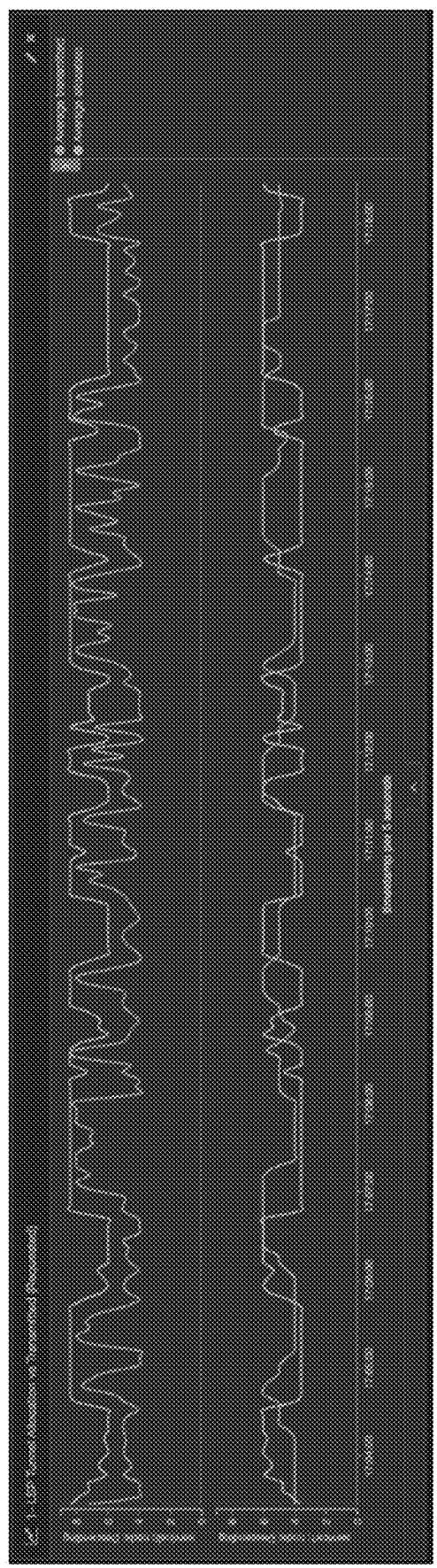

In another deployment scenario, the RL process provides the ability to modify the LSP tunnel allocation to handle bursts pre-emptively. FIG. 22 is a graph of tunnel allocation. The top graph (service2) has high priority whereas the bottom graph (service1) is best effort. It is interesting to see that the LSP tunnel BW (allocation) is increased pre-emptively when the RL process senses a change in traffic patterns. It also maintains the allocation when the transmission goes down momentarily, meaning that it expects further bursts in traffic.

Use Cases

Again, the RL process involves transitioning network states in the network 10 via actions in the network elements 50, 100, 200 based on a reward. The following table illustrates examples for the state, reward, and action.

| State | Reward | Action |
| --- | --- | --- |
| For each service: throughput dropped packets latency jitter out-of-order delivery | Maximize throughput of (high-priority) services and/or Maximize throughput of the overall network | *) Increase/decrease bandwidth of competing services *) re-route to less congested paths *) no action |
| For each port: throughput dropped packets packet errors | Minimize latency and/or jitter of (high-priority) services | *) re-route to shorter paths *) re-route to less congested paths |
| For each router (physical or virtual): Processor (CPU) Memory (RAM) | | *) increase/decrease router RAM or CPU to process queues faster *) no action |
| | Minimize the workload of routers | *) re-route services to less busy routers *) no action |
| | Minimize dropped packets or packet errors | *) Increase/decrease bandwidth of competing services *) re-route to less congested paths *) no action |

For the states, this data is derived from the telemetry (e.g., PM data). The states can be measured, managed, etc. on a per-service basis (e.g., LSP tunnel, Ethernet Virtual Circuit, Subnetwork Connection (SNC), etc.) and/or on a per-port basis (e.g., physical port or link). Throughput is a measure of the actual traffic on a channel, tunnel, service, etc. Dropped packets are a measure of the number of packets that were dropped such as due to congestion. Latency is a measure of packet delay. Jitter is a measure of deviation from a periodic clock. Out-of-order delivery relates to packets in a service being delivered out of a sequence. Other states can include packet errors and metrics related to a load of a network element such as processor, memory, etc.

The actions are specific to the identified rewards. For example, a reward of maximizing throughput of (high-priority) services and/or maximize throughput of overall network can have actions of increase/decrease bandwidth of competing services and/or re-route to less congested paths.

Another reward to minimize latency and/or jitter of (high-priority) services can have actions of re-route to shorter paths, re-route to less congested paths, and/or increase/decrease router RAM or CPU to process queues faster.

A further reward to minimize the workload of routers can have an action of re-route services to less busy routers.

Yet a further reward to minimize dropped packets or packet errors can have actions of increase/decrease bandwidth of competing services and re-route to less congested paths.

Those of ordinary skill in the art will appreciate the foregoing states, rewards, and actions are presented for illustration purposes, and various other states, rewards, and actions are contemplated for use in the network 10.

Self-Optimizing Network Example

Figure 23:
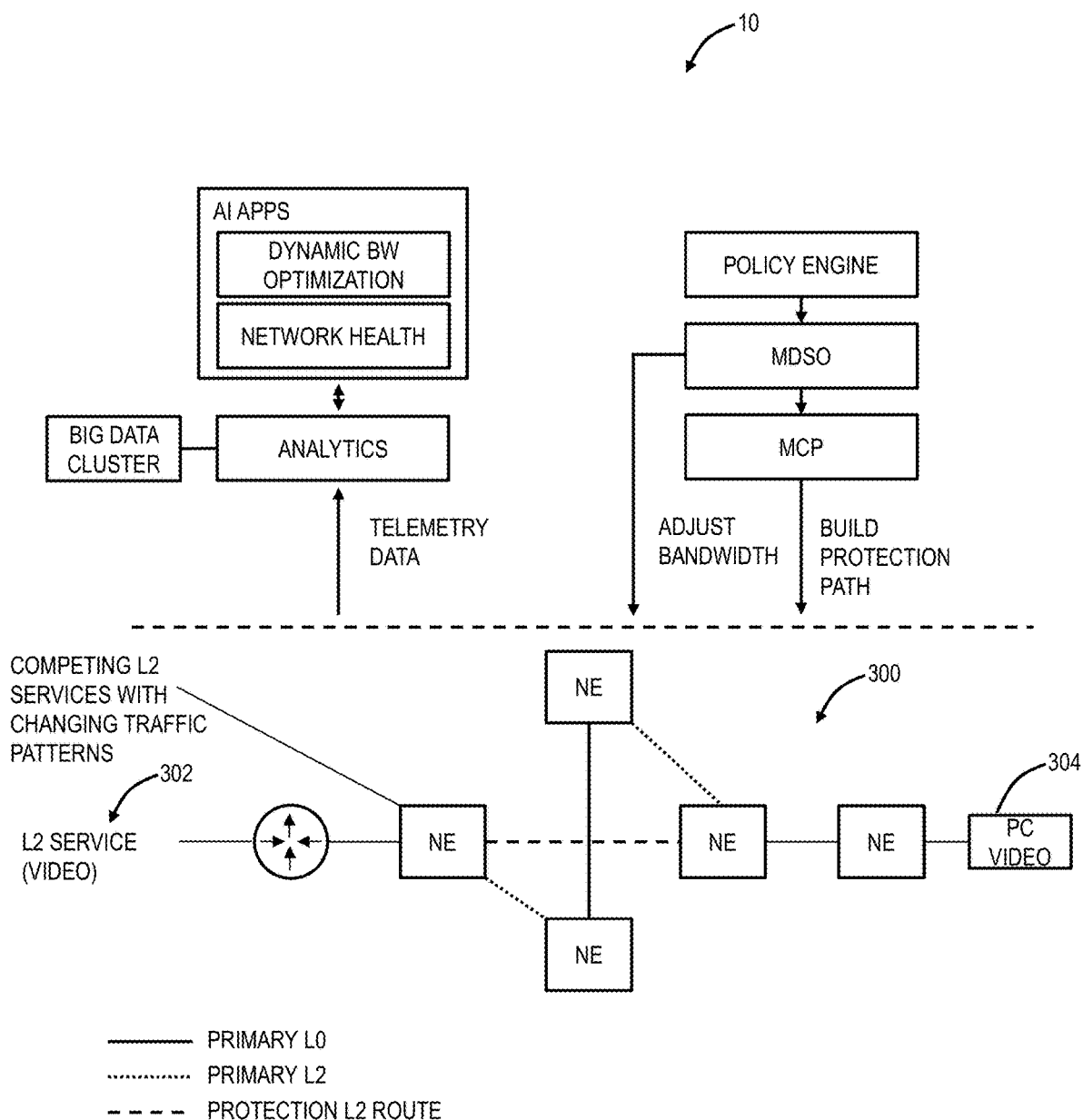
FIG. 23 is a network diagram of a network providing video service and utilizing the RL systems and methods described herein.
Figure 24:
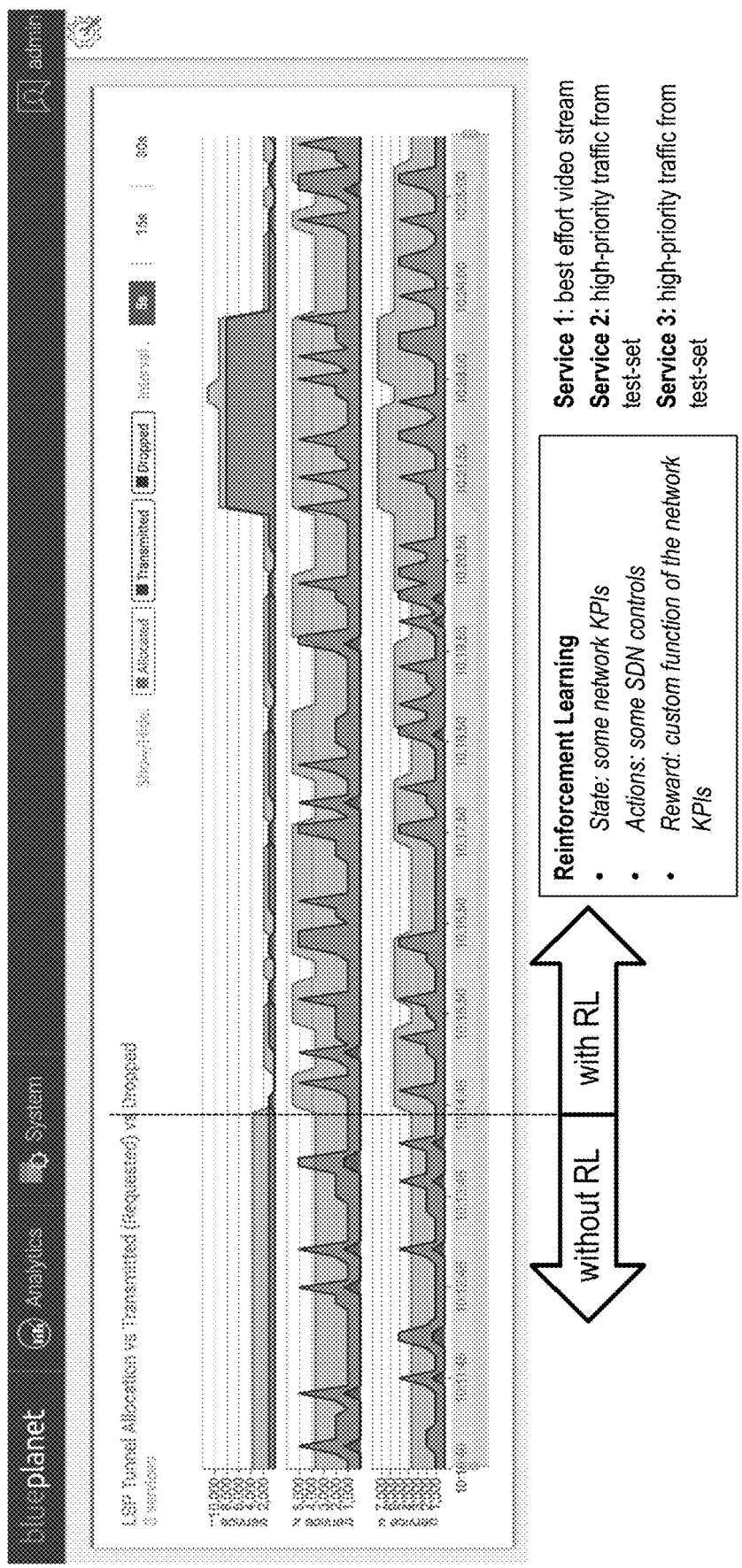
FIG. 24 is a graph of Label Switched Path (LSP) tunnel allocation versus transmitted bandwidth versus dropped packets in the network of FIG. 23.

FIG. 23 is a network diagram of a network 300 providing video service and utilizing the RL systems and methods described herein. FIG. 24 is a graph of LSP tunnel allocation versus transmitted bandwidth versus dropped packets. The network 300 includes a Layer 2 video service 302 which is consumed by a user device 304 which connects to the video service 302 through the network 300. The network 300 includes various network elements and supports Layer 0 (DWDM) and Layer 2 (packets). Note, in addition to the Layer 2 video service 302, the network 300 can include various Layer 2 services 306 with changing traffic patterns.

In operation, the RL system 10 was used to optimize the network 300 to support the Layer 2 video service 302. Again, the RL system 10 is used to determine the best action to be taken given the network state, i.e., learn what is the best policy. With respect to video, Quality of Experience (QoE) is a metric characterizing a video service. QoE is static, driven by service parameters agreed on in advance. Without RL, changes in bandwidth demands need to be provisioned manually, not in real time and congestion results in degradation of QoE.

With the RL system 10, the bandwidth of multiple packet services experiencing changing traffic patterns over time can be dynamically adjusted. The RL system 10 continuously monitors and optimizes the network 300, to learn the best policy, using reinforcement learning and key performance metrics trigger MDSO/MCP to take policy-driven, automated actions.

For video, the state can be an Rx and Tx bandwidth profile, the actions can include increase/decrease bandwidth, and the reward can include maximizing throughput, minimizing dropped packets, etc. For example, with limited bandwidth, the network 300 can set the video to low-priority video, and as additional bandwidth becomes available, the video can be set to a higher priority.

The graphs in FIG. 24 illustrate three video services in the network 300 (service 1 is best effort video while services 2 and 3 are high-priority video) and associated values of allocated, transmitted, and dropped packets. The X-axis is time, and there is a demarcation point showing when RL is initiated. As is seen in the graphs, without RL, there are scenarios where the dropped packets are high, and the allocated bandwidth is less than the transmitted bandwidth. After RL is enabled, the services 2 and 3 improve while the service 1 is set such that the allocated bandwidth is just under the transmitted bandwidth.

Accordingly, with RL, the network 300 adapts to changing traffic patterns, changing priorities, providing improved service QoE—adapting network bandwidth to the service's needs, and maintaining QoE.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to perform the steps of:
   determining a state of a network based on telemetry data;
   determining a value of a reward associated with the state;
   determining an action to take on the network to bring the network to a next state that is expected to have a better than or equal to value of the reward, wherein the action is based on Reinforcement Learning and is chosen for one of exploitation to obtain rewards and exploration to determine better actions;
   causing the action to be implemented in the network;
   determining an updated state of the network based on updated telemetry data subsequent to causing the action to be implemented in the network; and
   continuing the causing the action to be implemented in the network based on the updated state of the network;
   wherein the determining the state and the updated state of the network are both performed at a predetermined interval that is one of a regular interval and a varying frequency interval.

2. The non-transitory computer-readable medium of claim 1, wherein the determining the state and the updated state of the network are one or both also performed on demand.

3. The non-transitory computer-readable medium of claim 1, wherein the network is a packet network, and wherein the reward relates to any of throughput, latency, jitter, workload, dropped packets, and packet errors.

4. The non-transitory computer-readable medium of claim 1, wherein the action includes any of bandwidth changes, re-routing services, and hardware reassignment.

5. The non-transitory computer-readable medium of claim 1, wherein the reward is maximizing throughput of one or more services, high-priority services, or overall throughput of the network, and
   wherein the action includes any of i) increasing or decreasing bandwidth of competing services, the one or more services, and the high-priority services, ii) re-routing some services to less congested paths, and iii) no action.

6. The non-transitory computer-readable medium of claim 1, wherein the reward is maximizing latency and/or jitter of one or more services, and
   wherein the action includes any of i) re-routing some or all of the one or more services to shorter paths, ii) re-routing some or all of the one or more services to less congested paths, iii) adjusting router memory and/or processing capability, and iv) no action.

7. The non-transitory computer-readable medium of claim 1, wherein the reward is minimizing workload of network elements, and
   wherein the action includes any of i) re-routing one or more services to less busy network elements, and ii) no action.

8. The non-transitory computer-readable medium of claim 1, wherein the reward is minimizing dropped packets or packet errors, and
   wherein the action includes any of i) increasing or decreasing bandwidth of one or more services, ii) re-routing the one or more services to less congested paths, and iii) no action.

9. The non-transitory computer-readable medium of claim 1, wherein the steps include
   performing the determining steps and the causing step with any of controlled traffic, historical network data, and simulated network data, in a simulation, to learn optimal actions.

10. A method comprising steps of:
    determining a state of a network based on telemetry data;
    determining a value of a reward associated with the state;
    determining an action to take on the network to bring the network to a next state that is expected to have a better than or equal to value of the reward, wherein the action is based on Reinforcement Learning and is chosen for one of exploitation to obtain rewards and exploration to determine better actions;
    causing the action to be implemented in the network;
    determining an updated state of the network based on updated telemetry data subsequent to causing the action to be implemented in the network; and
    continuing the causing the action to be implemented in the network based on the updated state of the network;
    wherein the determining the state and the updated state of the network are both performed at a predetermined interval that is one of a regular interval and a varying frequency interval.

11. The method of claim 10, wherein the determining the state and the updated state of the network are one or both also performed on demand.

12. The method of claim 10, wherein the network is a packet network, and wherein the reward relates to any of throughput, latency, jitter, workload, dropped packets, and packet errors.

13. The method of claim 10, wherein the action includes any of bandwidth changes, re-routing services, and hardware reassignment.

14. The method of claim 10, wherein the reward is maximizing throughput of one or more services, high-priority services, or overall throughput of the network, and
    wherein the action includes any of i) increasing or decreasing bandwidth of competing services, the one or more services, and the high-priority services, ii) re-routing some services to less congested paths, and iii) no action.

15. The method of claim 10, wherein the reward is maximizing latency and/or jitter of one or more services, and
    wherein the action includes any of i) re-routing some or all of the one or more services to shorter paths, ii) re-routing some or all of the one or more services to less congested paths, iii) adjusting router memory and/or processing capability, and iv) no action.

16. The method of claim 10, wherein the reward is minimizing workload of network elements, and
    wherein the action includes any of i) re-routing one or more services to less busy network elements, and ii) no action.

17. The method of claim 10, wherein the reward is minimizing dropped packets or packet errors, and wherein the action includes any of i) increasing or decreasing bandwidth of one or more services, ii) re-routing the one or more services to less congested paths, and iii) no action.

18. The method of claim 10, wherein the steps include
    performing the determining steps and the causing step with any of controlled traffic, historical network data, and simulated network data, in a simulation, to learn optimal actions.

* * * * *